United States Patent
Cole et al.

(10) Patent No.: US 7,082,729 B2
(45) Date of Patent: Aug. 1, 2006

(54) COVER ASSEMBLY FOR AN IN-FLOOR FITTING

(75) Inventors: Michael T. Cole, Parkersburg, WV (US); Tim Bowman, Parkersburg, WV (US); Stephen T. English, Williamstown, WV (US); John Kohaut, Port Murray, NJ (US); Joe Young, Reedsville, OH (US)

(73) Assignee: Walker Systems, Inc., Williamstown, WV (US)

( * ) Notice: Subject to any disclaimer, the term of this patent is extended or adjusted under 35 U.S.C. 154(b) by 645 days.

(21) Appl. No.: 10/054,643

(22) Filed: Jan. 22, 2002

(65) Prior Publication Data

US 2002/0116883 A1 Aug. 29, 2002

Related U.S. Application Data

(63) Continuation-in-part of application No. 09/978,731, filed on Oct. 15, 2001, now Pat. No. 6,612,081.
(60) Provisional application No. 60/311,013, filed on Aug. 8, 2001, and provisional application No. 60/263,483, filed on Jan. 23, 2001.

(51) Int. Cl.
*H05K 5/03* (2006.01)

(52) U.S. Cl. .................. 52/220.8; 52/220.1; 174/53; 174/57; 174/66; 174/67; 220/3.3; 220/3.5; 220/3.8; 220/3.94; 439/136; 439/135; 439/141; 439/538; 439/650

(58) Field of Classification Search ................ 52/220.1, 52/220.3, 220.8; 174/66–67, 53, 57; 439/136, 439/135, 141, 538, 650; 220/3.5, 3.3, 3.8, 220/3.94

See application file for complete search history.

(56) References Cited

U.S. PATENT DOCUMENTS

| | | |
|---|---|---|
| 2,872,749 A | 3/1954 | Wiesmann |
| 3,646,244 A | 2/1972 | Cole |
| 3,666,134 A | 5/1972 | Rauch |
| 3,830,954 A | 8/1974 | Caudill |
| 4,027,097 A | 5/1977 | Gillemot |
| 4,058,358 A | 11/1977 | Carlisle |
| 4,109,095 A | 8/1978 | Kling et al. |
| 4,197,959 A | 4/1980 | Kramer |
| 4,228,317 A | 10/1980 | Cziment |
| 4,289,921 A | 9/1981 | Gartner et al. |

(Continued)

FOREIGN PATENT DOCUMENTS

| | | |
|---|---|---|
| FR | 2 535 914 | 11/1982 |
| JP | 405304713 A | 11/1993 |

*Primary Examiner*—Jeanette E Chapman
(74) *Attorney, Agent, or Firm*—McAndrews, Held & Malloy, Ltd.

(57) ABSTRACT

A cover assembly is provided for preventing water infiltration into an in-floor receptacle fitting, such as a poke-thru fitting. The cover assembly includes a trim flange which overlies the fitting and is adapted to support at least one receptacle within the fitting. A cover plate is mounted on the trim flange includes access doors for selectively covering and exposing the receptacles. A first seal member is interposed between the cover plate and the trim flange for sealing against water infiltration therebetween. The first seal may be in the form of a planar gasket or O-ring. A second seal, in the form of at least one compressible gasket, extends around the perimeter of the floor opening and is adapted to be compressed between the trim flange and the surface of the floor. The cover plate may also include top and bottom portions and a third seal member interposed between the top and bottom portions.

33 Claims, 16 Drawing Sheets

U.S. PATENT DOCUMENTS

| | | |
|---|---|---|
| 4,342,493 A | 8/1982 | Grenell |
| 4,343,411 A | 8/1982 | Chesnut et al. |
| 4,458,460 A | 7/1984 | Kohaut |
| 4,496,790 A | 1/1985 | Spencer |
| 4,541,538 A | 9/1985 | Swetnam |
| 4,640,564 A | 2/1987 | Hill |
| 4,656,798 A | 4/1987 | Hazen |
| 4,711,634 A | 12/1987 | Antone, II et al. |
| 4,733,017 A | 3/1988 | Wolfe-Taylor et al. |
| 4,770,643 A | 9/1988 | Castellani et al. |
| 4,774,384 A | 9/1988 | Gregory |
| 4,793,818 A | 12/1988 | Poirier |
| 4,810,833 A | 3/1989 | Meyers |
| 4,857,004 A | 8/1989 | Poirier |
| 4,874,906 A | 10/1989 | Shotey |
| 4,883,924 A | 11/1989 | Hadfield |
| 4,952,754 A | 8/1990 | Rye |
| 4,952,756 A | 8/1990 | Meyers |
| 5,017,153 A | 5/1991 | Bowman |
| 5,030,795 A | 7/1991 | Domigan |
| 5,032,690 A | 7/1991 | Bloom |
| 5,041,698 A | 8/1991 | Takagi et al. |
| 5,107,075 A | 4/1992 | Currier, Jr. |
| 5,148,348 A | 9/1992 | White |
| 5,160,808 A * | 11/1992 | Hadfield ............... 174/48 |
| 5,240,426 A | 8/1993 | Barla |
| 5,272,278 A | 12/1993 | Wuertz |
| 5,288,945 A | 2/1994 | Bruce |
| 5,306,178 A | 4/1994 | Huang |
| 5,563,373 A | 10/1996 | Doroslovac |
| 5,571,023 A | 11/1996 | Anthony |
| 5,588,853 A | 12/1996 | Anthony |
| 5,727,958 A | 3/1998 | Chen |
| 5,743,752 A | 4/1998 | Massebeuf |
| 5,866,845 A | 2/1999 | Markiewicz et al. |
| 6,998,735 B1 | 12/1999 | Patterson, Jr. |
| 6,018,126 A * | 1/2000 | Castellani et al. ......... 174/48 |
| 6,114,623 A | 9/2000 | Bonilla et al. |
| 6,132,227 A | 10/2000 | Boteler et al. |
| 6,175,078 B1 | 1/2001 | Bambardekar et al. |
| 6,179,634 B1 | 1/2001 | Hull et al. |
| 6,265,662 B1 * | 7/2001 | Riedy et al. ............ 174/67 |
| 6,307,152 B1 | 10/2001 | Bonilla et al. |
| 6,353,180 B1 | 3/2002 | DeBartolo, Jr. et al. |
| 6,417,446 B1 | 7/2002 | Whitehead |
| 6,545,215 B1 * | 4/2003 | Young et al. ............ 174/48 |

* cited by examiner

Section "A-A"

COVER ASSEMBLY FOR AN IN-FLOOR FITTING

RELATED APPLICATIONS

This application claims priority of Provisional Application Ser. No. 60/311,013, filed Aug. 8, 2001 and Provisional Application Ser. No. 60/263,483, filed Jan. 23, 2001, and is a continuation-in-part of application serial number U.S. patent application Ser. No. 09/978,731, filed Oct. 15, 2001, now U.S. Pat No. 6,612,081.

FEDERALLY SPONSORED RESEARCH OR DEVELOPMENT

Not Applicable

MICROFICHE/COPYRIGHT REFERENCE

Not Applicable

BACKGROUND OF THE INVENTION

In-floor fittings such as poke-thru fittings, after sets fittings, and preset fittings are installed in concrete floors to provide electrical receptacles and communication/data receptacles (or jacks) at desired locations in buildings. As a result, such fittings may be exposed to water, e.g. during carpet cleaning. It is desirable that such fittings are designed to prevent moisture infiltration from above the floor. In this respect, Underwriters Laboratories (UL) is proposing certification standards which will require such fittings to keep scrub water out of the portion of the fitting that houses the electrical outlet, e.g. the power portion. Scrub water is a soap and water mixture that is typically used when cleaning carpets and other finished floor surfaces.

BRIEF SUMMARY OF THE INVENTION

A cover assembly is usable with a fitting of which is disposed in a floor and has an inner compartment accessible through an opening in the upper surface of the floor. The fitting is configured so that source cables can be routed into the inner compartment from a location below the upper surface of the floor. The cover assembly includes a first portion which overlies the floor opening and is connectable to the fitting. The first portion may be in the form of a trim flange. The first portion includes a central opening which overlies the floor opening to provide access to receptacles carried by the fitting. The first portion may function as a mounting bracket for supporting receptacles, such as power receptacles and/or a communications/data receptacles. Alternatively, some or all of the receptacles may be supported by mounting brackets within the fitting itself. The cover assembly also includes a second portion which is mounted on the first portion and which overlies the receptacles carried by the fitting. The second portion includes access doors movable between closed positions to prevent access to the receptacles and open positions at which the receptacles are exposed and accessible from above.

A first seal member is interposed between the cover assembly first and second portions and is adapted to seal against water infiltration between the cover assembly first and second portions, and into the fitting. A second seal member interposed between the cover assembly first portion and the floor and is adapted to seal against water infiltration between the cover assembly and the floor, and into the fitting.

The first seal member may include a planar gasket sandwiched between the cover assembly first and second portions. The first seal member includes a access openings which provides access to the receptacles. Ribs extend upwardly around the perimeters of the access openings and abut against the bottoms of the access doors when the doors are at their closed positions. The interference fit between the ribs and the access doors seals against water infiltration therebetween and into the fitting. The first seal further includes a rib extending downwardly around the perimeter of the opening in the cover assembly first portion. The rib is configured to mate with a reciprocal groove formed in the cover assembly first portion so as to seal against water infiltration between the first seal member and the cover assembly first portion, and into the fitting.

The second seal member may include at least one compressible gasket extending around the perimeter of the floor opening. The gasket is adapted to be compressed between the cover assembly first portion and the floor's surface when the first portion is connected to the fitting. The second seal member may include a pair of such compressible, annular gaskets extending around the floor opening. A first gasket is compressed between the cover assembly first portion and the concrete floor, and the second gasket is compressed between the cover assembly first portion and the finished flooring, e.g., carpet or tile.

According to certain aspects of an embodiment of the present invention, the cover assembly second portion is in the form of a cover plate which includes a top portion, a bottom portion, and a plurality of access doors slidably mounted between the top and bottom portions. A third seal is interposed between the top and bottom portions and is adapted to seal against water infiltration between the top and bottom portions. The seal may be in the form of a compressible polymeric gasket and may be co-molded with one of the top and bottom portions.

DETAILED DESCRIPTION OF THE INVENTION

Figure 1:
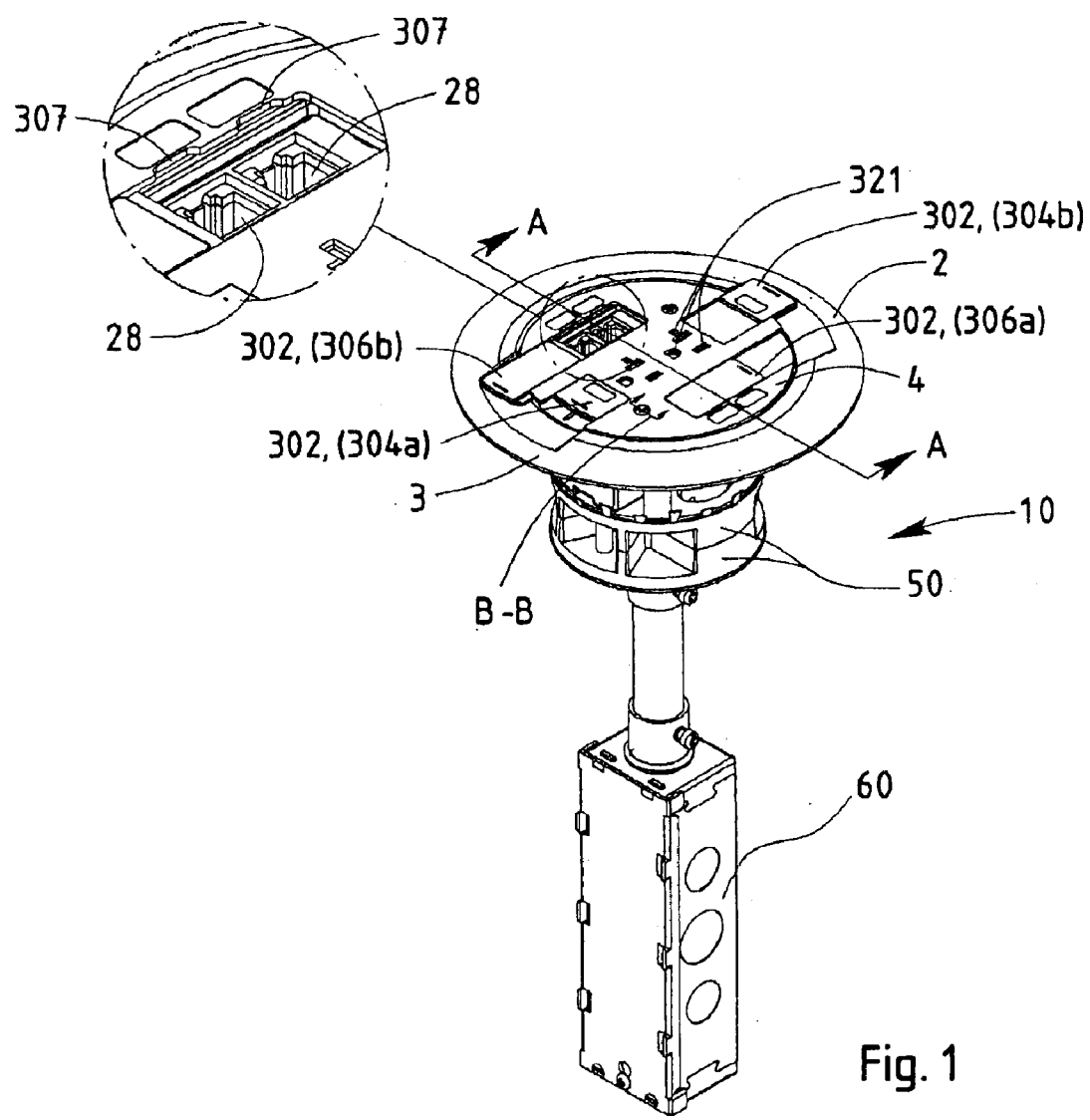
FIG. 1 is a perspective view of an in-floor fitting incorporating a cover assembly according to certain aspects of an embodiment the present invention.
Figure 2:
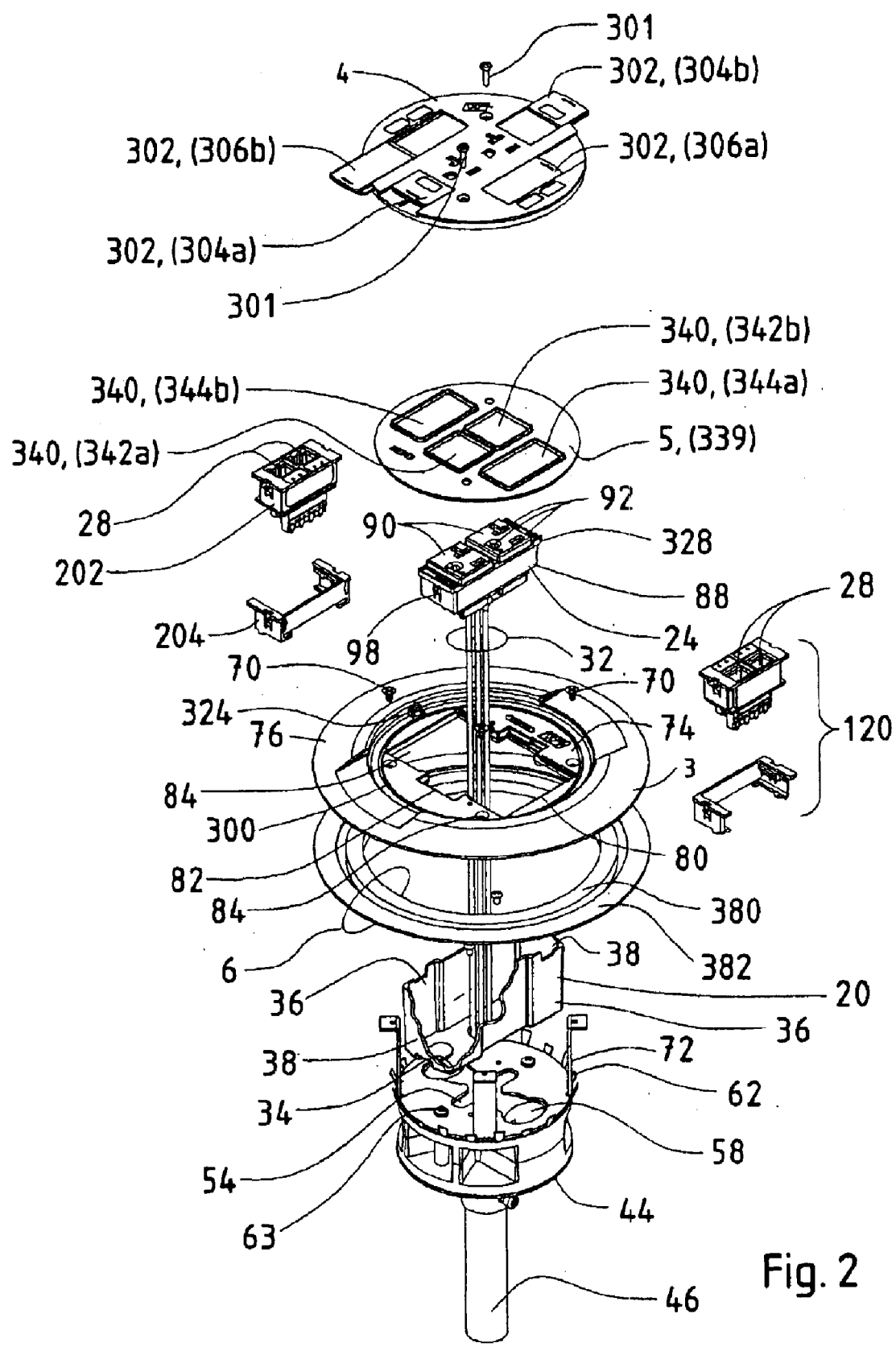
FIG. 2 is a partial, exploded perspective view of the fitting of FIG. 1.
Figure 3:
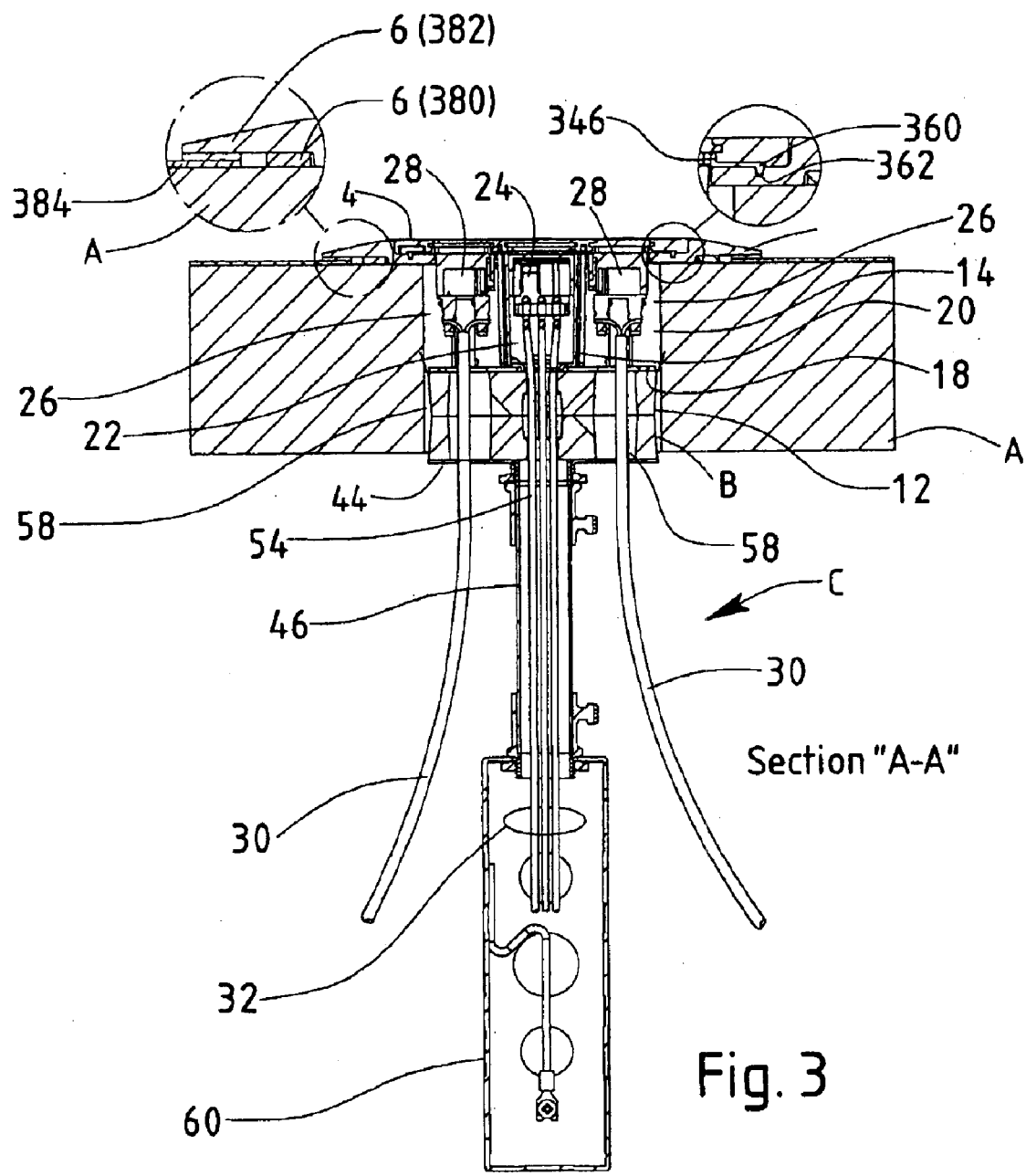
FIG. 3 is a cross-sectional view along line A—A of FIG. 1, showing the fitting has been installed in an opening in a concrete floor.

Referring to FIGS. 1–3, a water-tight cover assembly 2 for an in-floor fitting 10 generally includes a first portion in the form of a trim flange 3, a second portion in the form of a slide holder or cover plate 4, a first or internal seal member 5, and a second or external seal member 6. In the illustrated embodiment, the cover assembly 2 is described in connection with a poke-thru fitting. It will be appreciated, however, that the cover assembly 2 could readily be adapted for use with other types of in-floor fittings, such as preset or afterset fittings as are used with in-floor raceway systems.

The poke-thru fitting 10 may be constructed generally in accordance with the poke-thru fittings disclosed in U.S. Pat. No. 6,175,078, which issued Jan. 16, 2001 and is entitled "Flush Poke-thru Wiring Fitting Having A Height Adjustable Data Jack Mounting Bracket" (the "'078 patent") and U.S. patent application Ser. No. 09/642,951, which was filed on Aug. 21, 2000 and is entitled "Quad Receptacle, Dual Circuit Flush Poke-thru Wiring Fitting With Internally Mountable Communication/Data Jacks," (the "'951 application"). The disclosures of the '078 patent and the '951 application are hereby incorporated by reference.

The poke-thru fitting 10 is constructed for mounting in a fire-rated floor A of a building, such as a commercial office building. More specifically, the poke-thru fitting 10 may be installed in a circular opening B formed in floor A to activate a desired floor location. In this respect, the fitting is typically installed in a cored hole in a concrete floor. It is adapted to be activated by connecting source power service and communication/data signal service cables, which are otherwise disposed in the plenum C below the floor A, to receptacles, such as power receptacles and communication/data receptacles, respectively, mounted internally in the poke-thru fitting 10. This enables above-floor power plugs and signal transferring devices to be connected to the poke-thru fitting 10 and to thus transfer power and communication/data signals to equipment located on or above the floor A.

The poke-thru fitting 10 includes an insert 12 that is adapted to be installed in a floor opening B. The insert 12 includes an upper, generally cylindrical chamber or compartment 14, defined at the insert's upper end by a horizontally disposed top plate 16 and at its lower end by a horizontally disposed middle plate 18. (In the illustrated embodiment, the top plate 16 is generally defined by the trim flange 3). A receptacle barrier 20 divides the upper chamber 14 into a central space or portion 22, in which power receptacles 24 are disposed, and a pair of radially outer, semi-annular side spaces or portions 26 in which communication/data receptacles 28 are disposed.

In this respect, the fitting 10 has a plurality of communication/data receptacles 28 that are adapted to be activated within the fitting 10 by communication/data signal cables 30. Terminals in the upper faces of the receptacles 28 are accessible through access doors located in the cover plate 4. In the illustrated embodiment, the fitting 10 four RJ-45 category 5 type jacks (e.g., receptacles). It will be appreciated, however, that the fitting could readily support other types of communication/data receptacles, such as fiber optic jacks (see, e.g., FIG. 8).

The fitting 10 also supports at least one power receptacle 24, which is adapted to be activated within the fitting 10 by source power cables 32. In the illustrated embodiment, the power receptacle 24 is in the form of a duplex receptacle, which is configured to snap-mount into the trim flange 3, as is explained in greater detail below. Outlets in the power receptacle 24 may be wired in a single circuit or may be wired in a two electrically isolated circuits.

The receptacle barrier 20 physically separates and electrically isolates the connection between the power receptacle 24 and the power cables 32 from the connection between the communication/data receptacles 28 and the communication/data cables 30, so as to shield the communication/data cables 30, and their associated receptacles 28, from E.M.I. and/or R.F.I. emanating from the power cables 32. The receptacle barrier 20 is generally rectangular and includes a bottom wall 34, a pair of opposed side walls 36, a pair of opposed end walls 38, and a top opening which define the central space 22. The side walls 36 extend across the upper chamber 14 like chords and serve to divide the central space 22 from the side spaces 26. The receptacle barrier 20 shields the central space 22, where the high-voltage power cables 32 are connected to the power receptacles 24, from the side spaces 26, where the communication/data cables 32 are connected to the communication/data receptacles 28. An opening is formed in the bottom wall 34 for routing power cables 32 into the central space 22. It will be appreciated that the number an mounting locations of the receptacles 24, 28 within the fitting 10 can be varied without departing from the scope of the appended claims. For example, the communications/data receptacles 28 could be mounted in the central space 22 and the power receptacles 24 could be mounted in the side spaces 26, as is shown in the aforementioned '951 application.

The receptacle barrier 20 may be formed of a dielectric material such as polyvinyl chloride. The barrier 20 may also include E.M.I/R.F.I. shield in the form a foil collector disposed on its side walls, as is generally described in the aforementioned '078 patent. Alternatively the shield may be in the form of a metal jacket as is described in the aforementioned '951 application. The barrier is secured to the middle plate 18 by fasteners (not shown) which thread into reciprocal apertures in the plate 18. The barrier 20 may be grounded to drain E.M.I. and R.F.I., which may be generated in insert 12, with respect to the upper chamber 14, as is shown and described in the '078 patent and the '951 application.

Insert 12 further includes a fire stopping elements 50 as is known in the art. Suitable fire stopping elements are disclosed in U.S. Pat. No. 6,018,126 which issued to Castellani et al. on Jan. 25, 2000. The fire stopping elements 50 comprise intumescent material such as hydrated sodium silicate, and they form an insulating barrier to control temperature increases and retard the spread of flames. The elements 50 further protect against heat and flame by forming a refractory char as the temperature continues to rise. The details of the intumescent material and more fully described in the Castellani '126 patent.

The fire stopping elements 50 define a central raceway 54 through which the power cables 32 are extendable, and two side raceways 58 through which the communication/data cables 30 are extendable. The fire stopping elements 50 are supported between the middle plate 18 and the bottom plate 44. The middle and bottom plates 18, 44 have openings which are aligned with the raceways 54 and 58 in the elements 50 to permit wires to pass between the plenum C and the upper chamber 14.

The upper end of the EMT 46 may be connected to the bottom plate 44 for securing a conduit system thereto and for improving grounding capability. A conventional junction box 60 may be connected to the lower end of the EMT 46.

Insert 12 also includes a conventional annular retainer 62 which is disposed adjacent the middle plate 18. The retainer 62 retains the poke-thru fitting 10 in floor opening B. At least one fastener 63 extends between and is connected between the middle and bottom plates 18 and 44 for assisting in securing the fire stopping elements 50 between the plates. As was mentioned above, the fastener 63 may also be used to secure the barrier 20 in place and to facilitate grounding of the barrier 20.

The cover assembly 2 is connected with the upper end of the insert 12, and aligns with and overlies the floor opening B. As was discussed above, the cover assembly 2 includes a first portion in the form of trim flange or finish ring 3, a second portion in the form of cover plate 4, a first seal member 5, and a second seal member 6. The trim flange 3 may be made of cast aluminum or brass, for example, and it is secured to the insert 12 by fasteners 70. The fasteners 70 extend through the trim flange 3 and thread into reciprocal openings in legs 72 that extend upwardly from the middle plate 18. The trim flange 3 has a generally planar body portion 74 which overlies the floor opening B and an annular flange 76 which extends around the perimeter of the planar body portion 74 and overlies the surface of the floor A. The trim flange 3 also includes a central opening 80 that overlies the upper chamber 14 of the insert. The central opening 80 is defined by a central portion 82 that overlies the central space 22 of the chamber 14 and two side portions 84 that overly the side spaces 26 of the chamber 14. It will be appreciated that the portions 82, 84 of the central opening 80 could be formed by three separate openings.

The central portion 82 of the opening 80 is sized to receive and support the power receptacle 24. The power receptacle 24 may be in the form of a duplex receptacle (as shown in FIG. 2). The power receptacle 24 has a housing 88 which carries a pair of conventional electrical outlets 90 in its upper face. The outlets present blade openings 92 which are oriented for receiving a conventional male electrical plug (not shown). The housing is preferably formed of plastic and configured to snap into place in the trim flange 3. In this respect, the power receptacle 24 includes a pair of opposing locking tabs 98 that extend outwardly from the receptacle housing 88. The trim flange 3 is compressed between the tabs 98 and the top wall of the receptacle 24 when the receptacle is inserted downwardly into the trim flange 3. The power cables 32 extend into the housing 88 and are interconnected with the receptacle 24 for delivering power to the outlets 90, as is well known in the art. In this respect, the receptacle 24 may be pre-wired at the factory to reduce the required on-site installation time.

Figure 5:
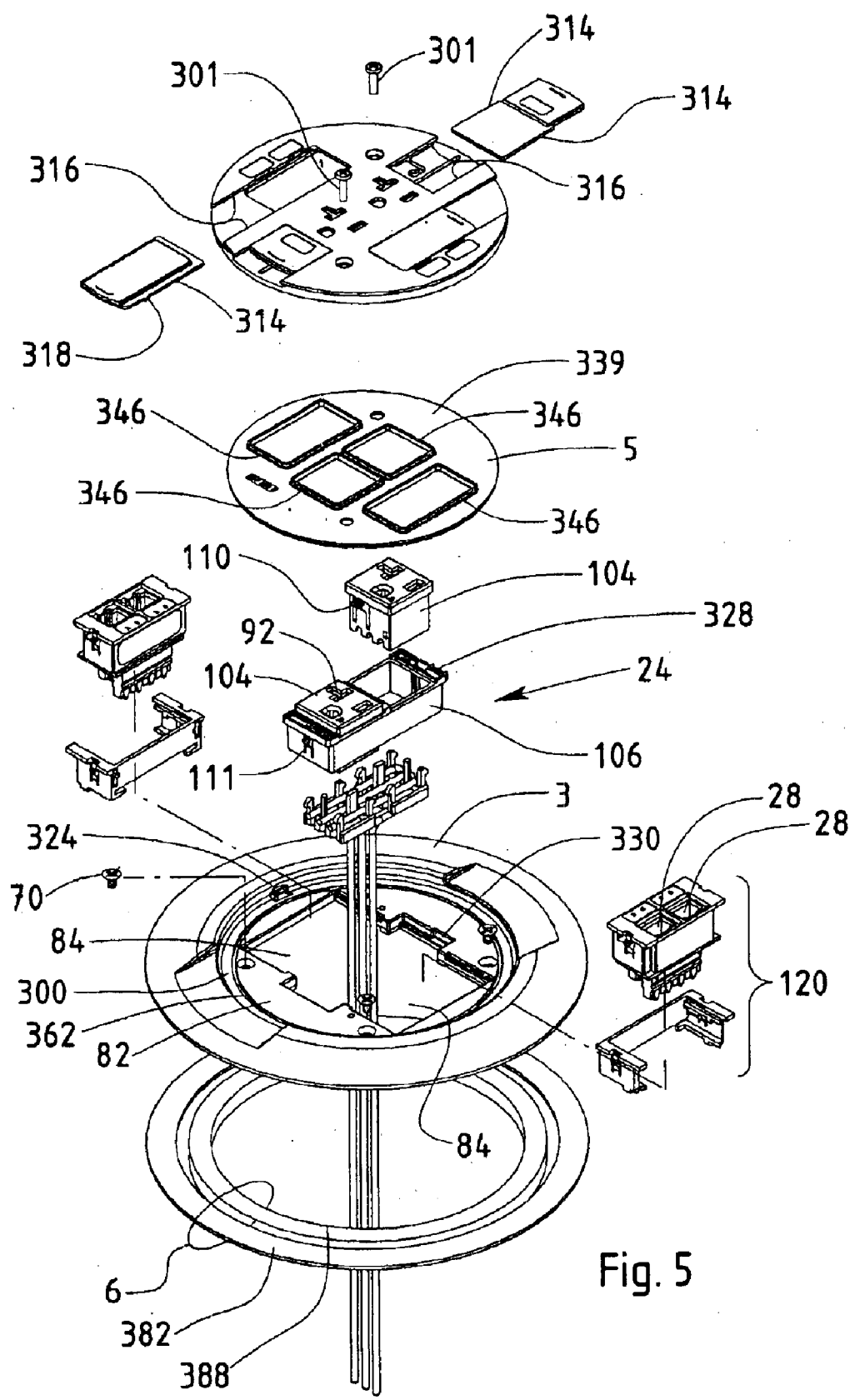
FIG. 5 is a partial exploded perspective view of the cover assembly illustrating an alternative power receptacle design.

Referring to FIG. 5, the power receptacle 24 may alternatively comprise a pair of simplex power receptacles 104 carried by a mounting bracket 106. Suitable simplex receptacles are shown in the aforementioned '951 application, and they are also used in the Model RC4 Poke-Thru Fitting as sold by Walker Systems, Inc. Each of the simplex receptacles 104 has a generally square housing. The housing presents a pair of locking tabs 10 similar to those provided on the duplex receptacle shown in FIG. 2. The locking tabs 110 allow the receptacles 104 to snap mount into the mounting bracket 106. The mounting bracket 106 similarly includes locking tabs 111 which allow it to snap mount in the trim flange. Alternatively, the mounting bracket could be connected to the trim flange 3 by a pair fasteners (not shown) which extend through the mounting bracket 106 and thread into reciprocal openings (not shown) in the trim flange 3.

Referring again to FIGS. 1–3, each of the side portions 84 of the central opening 80 is configured to support at least one communication/data receptacle 28. In the illustrated embodiment, each side portion 28 supports a pair of the communication/data receptacles 28. The communication/data receptacles 28 are carried by mounting brackets 120, which are configured for mounting in the side portions 84. The mounting brackets 120 may be constructed generally in accordance with those disclosed in the '078 patent.

Figure 7:
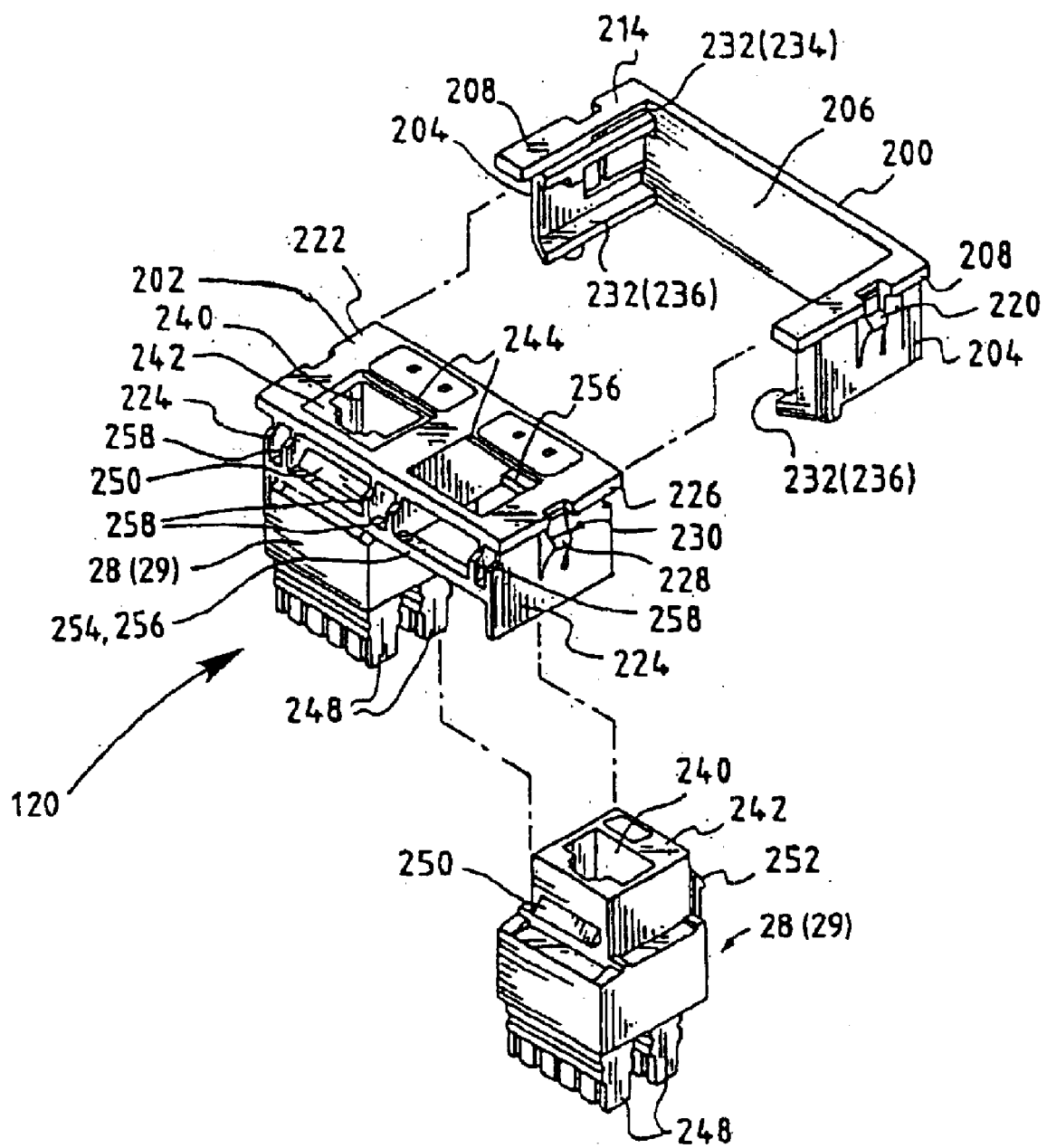
FIG. 7 is an exploded perspective view of a first embodiment of a communication/data mounting bracket.
Figure 8:
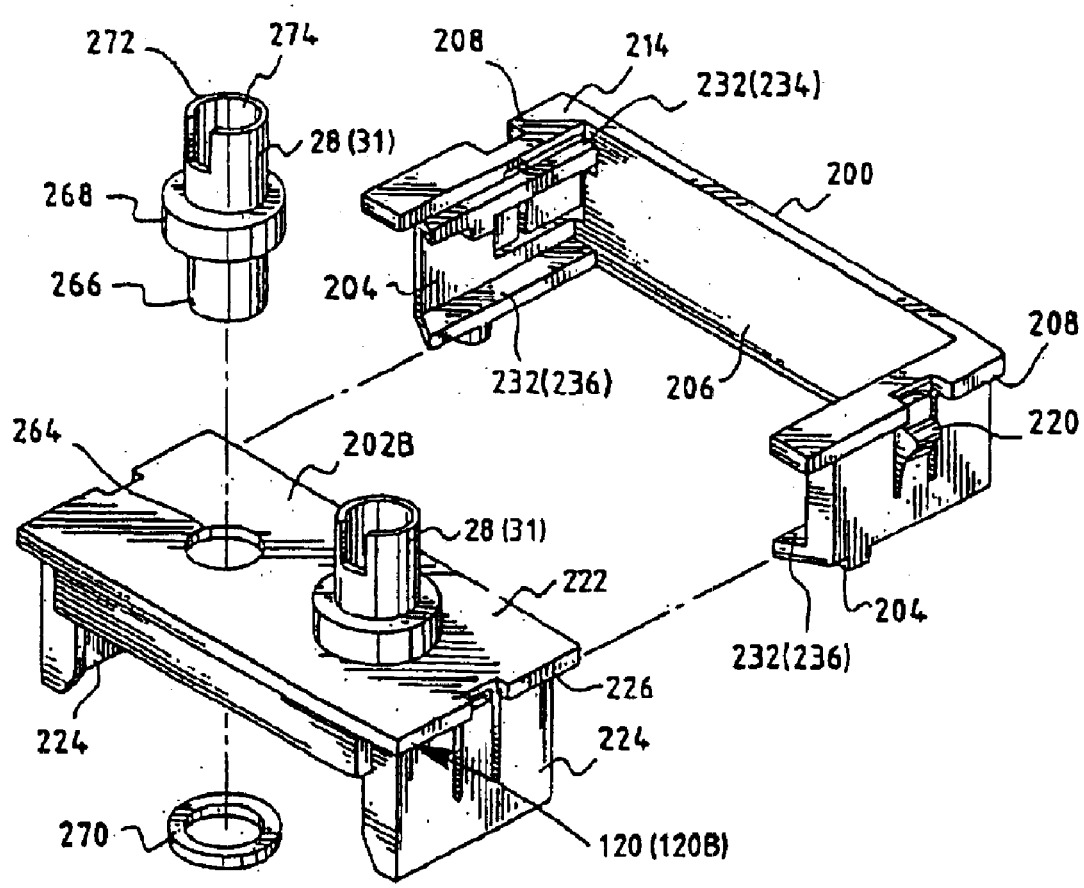
FIG. 8 is an exploded perspective of a second embodiment of a communication/data mounting bracket.

Referring additionally to FIGS. 7 and 8, height-adjustable mounting brackets 120 may be used so that data jacks of varying configurations can be internally mounted in the fitting in a protected fashion, as is disclosed in the '078 patent. The mounting brackets 120 may utilize a two-piece construction consisting of a first portion 200 that is mounted in the trim flange 3 (at a fixed height) and a second portion 202 which is height adjustable relative to the bracket first portion 200.

The bracket first portion 200 is adapted to be mounted within one of the side portions 84 of opening 80 so that the bracket first portion 200 overlies a respective one of the side spaces 26 of the compartment 14. The bracket first portion 202 is generally U-shaped and includes a pair of opposed side walls 204 and an end wall 206 extending between the side walls. Flanges 208 extend outwardly from the top edges of the side walls 204 and are positioned to overlay the edges of the side portion 84 and engage against the top of the trim flange 3 to support the bracket first portion 200 above the side space 26 of the chamber 14. The top face of the trim flange 3 is recessed around the side portions 84 so that the top wall 214 of the bracket first portion 200 fits substantially flush with the top face of the planar body portion 74 of the flange 3.

Locking tabs 220 are formed in the side walls 204 of the bracket first portion 200 for securing the mounting bracket 120 within the side portion 84 of the central opening 80. As the mounting bracket 120 is inserted downwardly into the side opening 84, the lower edges of the locking tabs 220 engage against the edges of the opening 80. Continued downward pressure on the mounting bracket 120 biases the tabs 220 inwardly to permit the bracket 120 to move downwardly into the opening 80. The lower edges of the tabs 220 are beveled to ease insertion of the bracket 120 into the opening 80. Once the upper edges of the tabs 220 extend past the lower face of the trim flange 3, the tabs 220 spring outwardly to lock the bracket 120 in place.

The bracket second portion 202 includes a top wall 222 and a pair of downwardly extending side walls 224. The mounting bracket second portion 202 is adapted to receive and support at least one communication/data receptacle 28 such that an upper terminal of the receptacle is accessible through the cover plate 4 and a lower terminal of the receptacle is contained within the chamber 14 for interconnection with a communication/data cable.

The bracket second portion 202 is mountable in the bracket first portion 200 in a height adjustable fashion, whereby the top wall 222 of the bracket second portion 202 may be varied relative to the top wall 214 of the bracket first portion. For this purpose, the top wall 222 extends beyond the edges of the side walls 224 to define a pair of outwardly extending flanges or lips 226. Tabs 228 extending outwardly below the flanges 226 and define grooves 230 which are adapted to slidably engage with reciprocal ribs 232 formed on the inner surfaces of the side walls 204 of the bracket first portion 200. In the illustrated embodiments, the bracket first portion 202 includes an upper pair of opposed ribs 234 and a lower pair of opposed ribs 236. When the bracket second portion 202 is slid onto the upper ribs 234, the top wall 222 of the bracket second portion 202 is substantially flush with the top wall 214 of the bracket first portion 200. Conversely, when the bracket second portion 202 is slid onto the lower ribs 236, the top wall 222 of the bracket second portion 202 is spaced below the top wall 214 of the bracket first portion 200. In either position, an upper terminal of the communication/data receptacle 28 carried by the bracket 12 is accessible through an associated one of the access doors on the cover plate 4, whereas the lower terminal of the receptacle 28 is positioned within the upper compartment 14 (and, more specifically, in one of the side spaces 26) for interconnection to the appropriate service cable. In this manner, communication/data receptacles 28 of varying heights can be internally mounted in the fitting 10 in a protected fashion. As will be appreciated, the spacing between the upper and lower ribs 234, 236 is dependent upon the construction of the communication/data receptacles 28 that are to be installed in the fitting. Moreover, additional pairs of ribs 232 could be formed on the bracket first portion 200 to accommodate more than two different heights of receptacles 28.

By way of example, the mounting bracket 120 of FIG. 7 is configured to support a pair of RJ-45 Category 5 data receptacles or jacks 29 in a protected fashion within the fitting 10. When installed, terminals 240 in the top faces 242 of the jacks 29 are accessible through reciprocal openings 244 formed in the top wall 222 of the bracket second portion 202, whereas the terminal banks 248 in the lower ends of the jacks 29 are contained within the compartment 14 for interconnection with the communication/data cable 30. (See FIG. 3). The mounting bracket second portion 202 shown in FIG. 7 is commercially available from the Pass & Seymour of the LeGrand Corporation as a model 2A-U2 KEY connector, and is constructed to support a pair of Keystone data jacks that are also commercially available from Pass & Seymour. It will be appreciated, however, that the bracket second portion 202 can readily be configured to accommodate variety of different commercially available data jacks including other RJ-XX series connectors, (such as the RJ-11 and RJ-12 connectors), fiber optic connectors (see, e.g., FIG. 8), and co-axial connectors.

The jacks 29 (shown in FIG. 7) are configured to snap into place in the bracket second portion 202. For this purpose each jack 29 includes a pair of outwardly extending locking tabs 250, 252. At least one of the tabs 250, 252 is constructed such that it can be biased inwardly. The jack 29 is installed by aligning it below one of the openings 244 in the top wall 222 of the bracket second portion 202. The jack 29 is then moved upwardly until the top faces of the tabs 250, 252 engage against transverse legs 254, 256 that extend between the side walls 224. Continued upward movement of the jack 29 relative to the bracket second portion 202 biases the tab 252 inwardly. Once the lower edges of the tabs 250, 252 move past the transverse legs 254, 256, the tab 252 snaps back outward to lock the jack 29 into place between the transverse legs 254, 256 and the top wall 222 of the bracket second portion 202.

Once installed, the top face 242 of the jack 29 fits flush against the bottom face of the top wall 222. Upward movement of the jack 29 is restricted upwardly by the interface between the jack 29 and the top wall 222, whereas downward movement is restricted by the interface between the tabs 250, 252 and the transverse walls 254, 256. The jack 29 is constrained laterally relative to the bracket second portion 202 by walls 258 that extend downwardly from the top wall 222 on either side of the openings 244. Once the jacks 29 are installed into the bracket second portion 202, the bracket second portion 202 is slid into place on the upper 234 ribs of the bracket first portion 200. The lower terminals 248 of the jacks are then appropriately connected to the communications/data service cable 30 and the mounting bracket 120 is installed into place in one of the side portions 24 of the opening 80. With the bracket second portion 202 positioned on the upper ribs 234, the top faces 242 of communication/data jacks 29 fit substantially flush with the top of the recess in the trim flange 3. The terminals 240 of the jacks 29 are accessible through the access doors in the cover plate 4, whereas the lower terminals 248 are contained within the side space 26 of the upper chamber 14.

FIG. 8 illustrates an embodiment 120B of the mounting bracket, which is configured to support a pair of fiber optic receptacles (or jacks) 31 in a protected fashion within the fitting 10. The only difference from the embodiment of FIG. 7 is the construction of the bracket second portion 202B, and, in particular, the interface between the bracket second portion and the receptacles 31. In this embodiment, the top wall 222 of the bracket second portion 202B includes a pair of generally circular apertures 264 (one shown) which are sized to receive conventional fiber optic receptacles 31. As will be appreciated, the size and shape of the apertures 264 is dependent on the specific fiber optic receptacle 31 that is employed. (This embodiment is also well suited for use with co-axial jacks which are mounted to the bracket in a similar fashion.) The fiber optic receptacle 31 is installed in the bracket second portion 202B by inserting its lower terminal 266 downwardly through the opening 264 until an annular rib 268 formed on the receptacle abuts against the top wall 222 of the bracket second portion 202B. The receptacle 31 is secured in place in the opening 264 by a nut 270 that threads onto the lower end of the receptacle 31. The bracket second portion 202B is then slid into place on the lower ribs 236 of the bracket first portion 200. The lower ribs 236 are positioned such that the upper face 272 of the fiber optic receptacle 31 is substantially flush with the upper wall 214 of the bracket first portion 200. Hence, when the bracket 120B is installed into the fitting 10, the upper edges of the fiber optic receptacles 31 are recessed below the cover plate 4 and aligned substantially flush with the planar body portion 74 of the trim flange 3. The upper terminal 274 of the jack 26 can be accessed through the appropriate access door in the slide holder 4. When the jack 26 is not in use, the access door is closed to protect the jack from dirt, floor traffic, etc. The lower terminal of the jack extends into the side space 26 of the chamber 14 and is appropriately interconnected with fiber optics service cable.

It will be appreciated that the mounting bracket 120 can take other forms without departing from the scope of the appended claims. For example, as is shown in the '126 patent, the mounting bracket may be in the form of a plate which is configured to mount in the trim flange 3 and support at least one communication/data receptacle.

Figure 6:
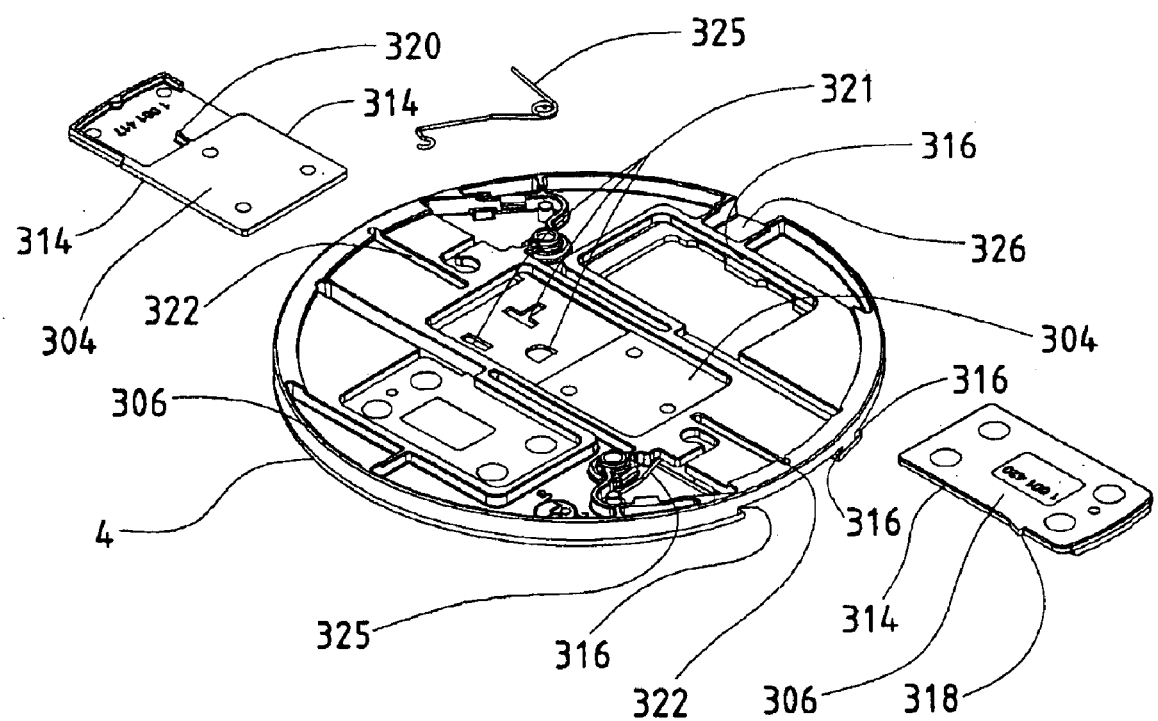
FIG. 6 is an exploded bottom view of a cover plate from the cover assembly of FIG. 1.

Referring to FIGS. 1, 2, and 6, the cover plate 4 is generally circular and is sized to fit in a generally annular recess 300 formed in the top of the trim flange 3. A pair of fasteners 301 secure the cover plate to the to the trim flange 3 and compress the internal gasket 5 to seal against water infiltration between these components. The cover plate 4 includes a plurality of access doors 302 for selectively covering and exposing the receptacles 24, 28 carried by the fitting 10. In the illustrated embodiment, the cover plate 4 carries two power access doors 304i a, 304b and two communication/data access doors 306a, 306b. Each of the power access doors 304a, 304b is associated with one of the outlets 90 in the power receptacle 24 and is movable between an inner, closed position (see, e.g., door 304a in FIG. 1) at which it overlies the associated outlet to prevent access thereto and an outer, open position (see, e.g. door 304b in FIG. 1) at which the outlet is exposed and accessible from above the floor. Similarly, each of the communication/data access doors 306a, 306b is associated with a pair of the communication/data receptacles 28 and is movable between an inner, closed position (see, e.g., door 306a in FIG. 1) at which it overlies the associated communication/data receptacles 28 to prevent access thereto and an outer, open position (see e.g. the door 306b in FIG. 1) at which the associated communication/data receptacles 28 are exposed and accessible from above the floor. As can be seen in the enlarged view in FIG. 1, the communications openings in the cover plate 4 may include recesses 307 to provide finger access for ease of removal of communications plugs (not shown) from the communication/data receptacles 28 carried by the fitting. It will be appreciated, that individual access doors could be provided for each of the communication/data receptacles 28. Similarly, a single access door could be provided for both of the outlets 90 in the power receptacle.

Preferably the access doors 302 are slidably connected to the cover plate 4 for movement between their open and closed positions. For this purpose, the access doors 302 present outwardly extending flanges or legs 314 which are configured to slidably engage in reciprocal grooves or slots 316 formed in the cover plate 4. Locking tabs 318 may be provided for retaining the access doors within the slots 316. In the illustrated embodiment, locking tabs 318 are formed on the side edge of the communication/data access doors 306. The power access doors 304 may include similar locking tabs, or they may, for example, include locking pins 320 in their bottom faces which align and mate with reciprocal slots 322 in the cover plate 4. The interface between the pin 320 and the slot 322 retains the access door 304 in the cover plate and also serves to limit its travel between its inner/closed position and its outer/open position.

Blade openings 321 in the cover plate 4 align with corresponding blade receiving opening 92 in the outlets 90. When a power access door 304 is moved to its open position, the outlet associated with that door is exposed through the openings 321 in the cover plate 4 to permit an electrical plug (not shown) to be connected to the outlet for activation of above floor power services. The power access doors 304 are biased to their closed positions, e.g., by springs 325, such that they automatically close when a plug is removed.

Preferably the cover plate 4 and the power receptacle 24 are constructed so that they can only be mounted in the trim flange 3 in one orientation. This is done to ensure that the blade openings 321 in the cover plate 4 align the blade openings 92 of the power outlets 90. For example, the trim flange 3 may include a boss 324 (see FIGS. 2 and 5) configured to align with a reciprocal slot 326 (see FIG. 6) in the cover plate 4 to ensure proper orientation of these two components. Similarly, the power receptacle 24 may include a protrusion or tab 328 which is configured to mate with a reciprocal groove or recess 330 in the edge of the central opening 80, so as to fix the orientation of the receptacle 24 relative to the trim flange 3.

Figure 4:
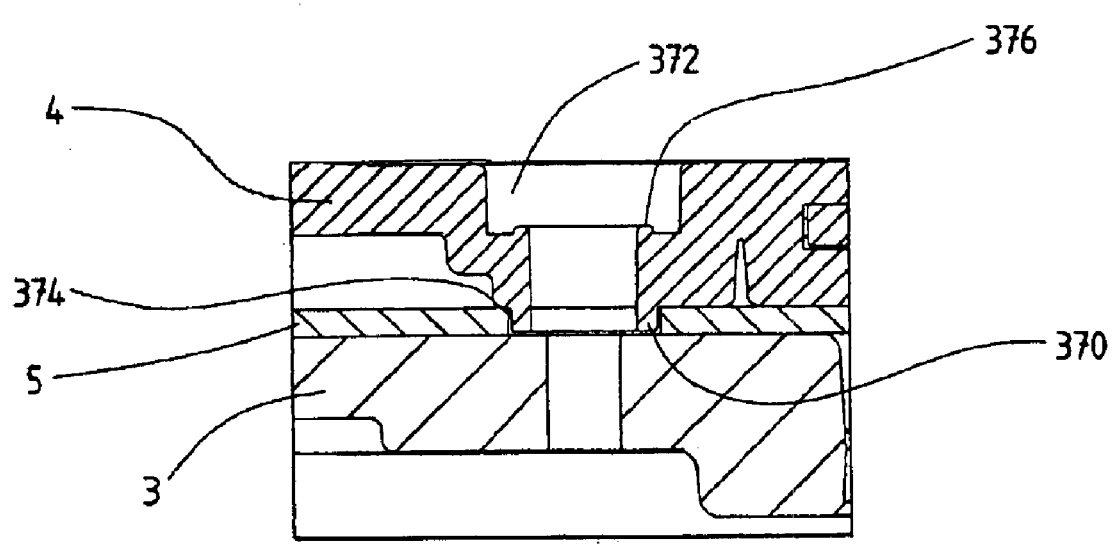
FIG. 4 is a partial cross-sectional view along line B—B of FIG. 1.

FIGS. 4 and 5 illustrate how the first and second seal members 5, 6 prevent moisture from infiltrating the inner compartment of the fitting 10. The first, or internal seal member 5 is in the form of a generally planar gasket 339. The gasket 339 is interposed or sandwiched between the cover plate 4 and the trim flange 3. The first seal member 5 is made out of a material such as santoprene or silicon, which can be injection molded or press molded. The first seal member 5 has a plurality of access openings 340. The access openings 340 overlie the receptacles 24, 28 to provide access to the receptacles through the cover plate 4. In particular, the first seal member 5 includes a pair of power access openings 342a, 342b, each of which overlies one of the outlets 90 in the power receptacle 24. The first seal member also includes a pair of communication/data access openings 344a, 344b, each of which overlies a pair of the communication/data receptacles 28. It will be appreciated that separate communication/data access openings 344 could be provided for each of the communication/data receptacles 28. Moreover, the access openings for the power receptacles 24 could be in the form of slits which overlay the blade openings 92 in the receptacle, as is generally shown in U.S. Pat. No. 5,017,153. Ribs 346 extend upwardly around the perimeter of the access openings 340 and wrap around the receptacles 24, 28. Each of the ribs 346 is positioned to engage against the bottom face of a respective access door 302 when the door is at closed position so as to seal against water infiltration into the fitting.

As will be appreciated the ribs 346 could be eliminated by forming the seal 5 with a planar top face that extends above the top faces of the receptacles. However, the ribs 346 provide the added benefit of reducing the force required to open and close the slide-mounted access doors 302. This is because the ribs 346 minimize the surface area of the first seal member 5 that contacts the underside of the doors 302, while still providing an adequate seal against the doors 302. Reducing the surface area of the contact between the first seal member 5 and the access doors 302 results in a corresponding reduction in the friction between the underside of a given door and the first seal member as the door is moved between its open and closed position. This also reduces the spring force requirements for closing the slide-mounted access doors 302. The material used to form the gasket 339 can be impregnated with a lubricant to enhance the lubricity of the gasket 339, which is beneficial for further reducing the friction between the ribs 346 and the slide-mounted access doors 302.

The first seal member 5 also has a second rib 360 or bead extending downwardly from its bottom face. (See FIG. 3). The second rib 360 is sized and positioned to extend around the perimeter of the central opening 80 in the trim flange 3, and, hence, around the perimeter of the receptacles 24, 28. The second rib 360 seats in a reciprocal annular groove 362 formed in the upper face of the trim flange 3. This rib 360 provides a watertight seal between the trim flange 3 and the first seal member 5 independent of a clamping pressure applied by the fasteners 301. As a result, fewer fasteners are needed to secure the cover plate 4 to the trim flange 3. The groove 362 in the trim flange 3 is sized to form an interference fit the second rib 360, so as to prevent moisture infiltration between the cover plate 4 and the trim flange 3 and into the internal compartment 14 of the fitting 10. It will be appreciated that the second rib 360 could alternatively be formed of a plurality of ribs, each of which surrounds one or more of the receptacles 24, 28.

Referring to FIG. 4, a boss 370 on the bottom face of the cover plate 4 penetrates through the first seal 5 and creates a positive stop between the cover plate 4 and the flange 3. The boss 370 may, as is illustrated, be formed concentrically with the mounting screw aperture 372 in the cover plate. The boss creates a stepped area 374, which compresses the first seal member 5 sufficiently to prevent water infiltration into the fitting 10. The boss 370 also prevents the cover plate 4 from bowing, thereby ensuring proper operation of the access doors. As can also be seen in FIG. 4, the screw aperture 372 in the cover plate 5 includes a raised inner ridge 376, which creates a positive water stop when a screw is tightened down onto it.

As can be seen in FIGS. 3 and 5, the second seal member 6 includes at least one compressible annular gasket which extends around the perimeter of the floor opening and is compressed between the trim flange 3 and the floor to provide a watertight seal which prevents water from leaking into the fitting. Preferably the second seal includes a first, inner gasket 380, which is sized such that it is compressed between the flange 3 and the main floor A, and a second, outer gasket 382, which is sized such that it is compressed between the finished floor 384 and the flange 3. The gaskets 380, 382 are constructed of a compressible foam material and are attached to the underside of the flange 3, e.g., by adhesive. The gaskets 380, 382 permit the flange 3 to be used with a variety of finished floor materials, including both carpet an tile. In this respect, the outer gasket 382 is thinner than the inner gasket 380. When the flange 3 is installed over a tile floor, the outer gasket 382 will be compressed between the flange 3 and the tile to seal against water infiltration. In such applications, the inner gasket 380 may or may not be compressed against the main floor. By contrast, in carpet application, the primary sealing function will be provided by the in inner gasket 380.

Referring now to FIGS. 9–16 a cover assembly 402 according to certain aspects of a second embodiment of the present invention includes a first portion in the form of a trim flange 403, a second portion in the form of a slide holder or cover plate 404, a first or internal seal member 405, a second or external seal member 406 (see FIG. 12) and a third seal member 408.

The construction of the trim flange 403 is generally the same as the trim flange 3, and, therefore, it will not be described in detail. The trim flange 403 includes a central opening 410 that overlies the upper chamber 14 of the fitting 10. The central opening 410 is defined by a central portion 412 that overlies the central space 22 of the chamber 14 and two side portions 414 that overly the side spaces 26 of the chamber 14. The central portion 412 of the opening 410 is sized to receive and support the power receptacle 24, whereas each side portion 414 is sized to receive and support at least one communication/data receptacle 28 in generally the same manner as was described above. Fasteners 413 extend through apertured flanges 415 on the power receptacle 24 and thread into reciprocal openings 416 in the trim flange 3 for securing the power receptacle 24 to the trim flange. The communication/data receptacles 28 include mounting brackets 417 that are configured to snap into the trim flange 3, as was described above. Each mounting bracket 417 carries one communication/data receptacle in the illustrated embodiment. It will be appreciated, however, that, as was described above, multiple communication/data receptacles 28 could be carried by each of the mounting brackets 417. Fasteners 418 extend through openings 420 in the trim flange and thread into reciprocal openings in the fitting for securing the trim flange to the in-floor fitting, in generally the same manner as was described above.

The cover plate 404 includes a top portion 419, the third seal member (or cover plate seal member) 408, a plurality of access doors 422, and a bottom portion 424. The top portion 419, bottom portion 424, and access doors 422 are preferably molded from a relatively rigid polymeric material, such as PVC. The third gasket 408 is preferably formed of a flexible polymer, such as silicon, and is preferably co-molded with either the top portion 418 or bottom portion 424.

The access doors 422 are slidably mounted between the top and bottom portions 418, 424 for selectively covering and exposing the receptacles 24, 28 carried by the fitting 10. In the illustrated embodiment, the cover plate 404 carries two power access doors 426 and two communication/data access doors 428. Each of the power access doors 426 is associated with one of the outlets in the receptacle 24 and is movable between an inner, closed position at which it overlies the associated outlet to prevent access thereto, and an outer, open position at which the outlet is exposed and accessible from above the floor. It will be appreciated that a single access door could alternately be provided for both of the outlets in the power receptacle 24. Each of the communication/data access doors 428 is associated with one of the communication/data receptacles 28 and is movable between an inner, closed position at which it overlies the associated receptacle 28 to prevent access thereto and an outer, open position at which the associated communication/data receptacle is exposed and accessible from above the floor.

Figure 9:
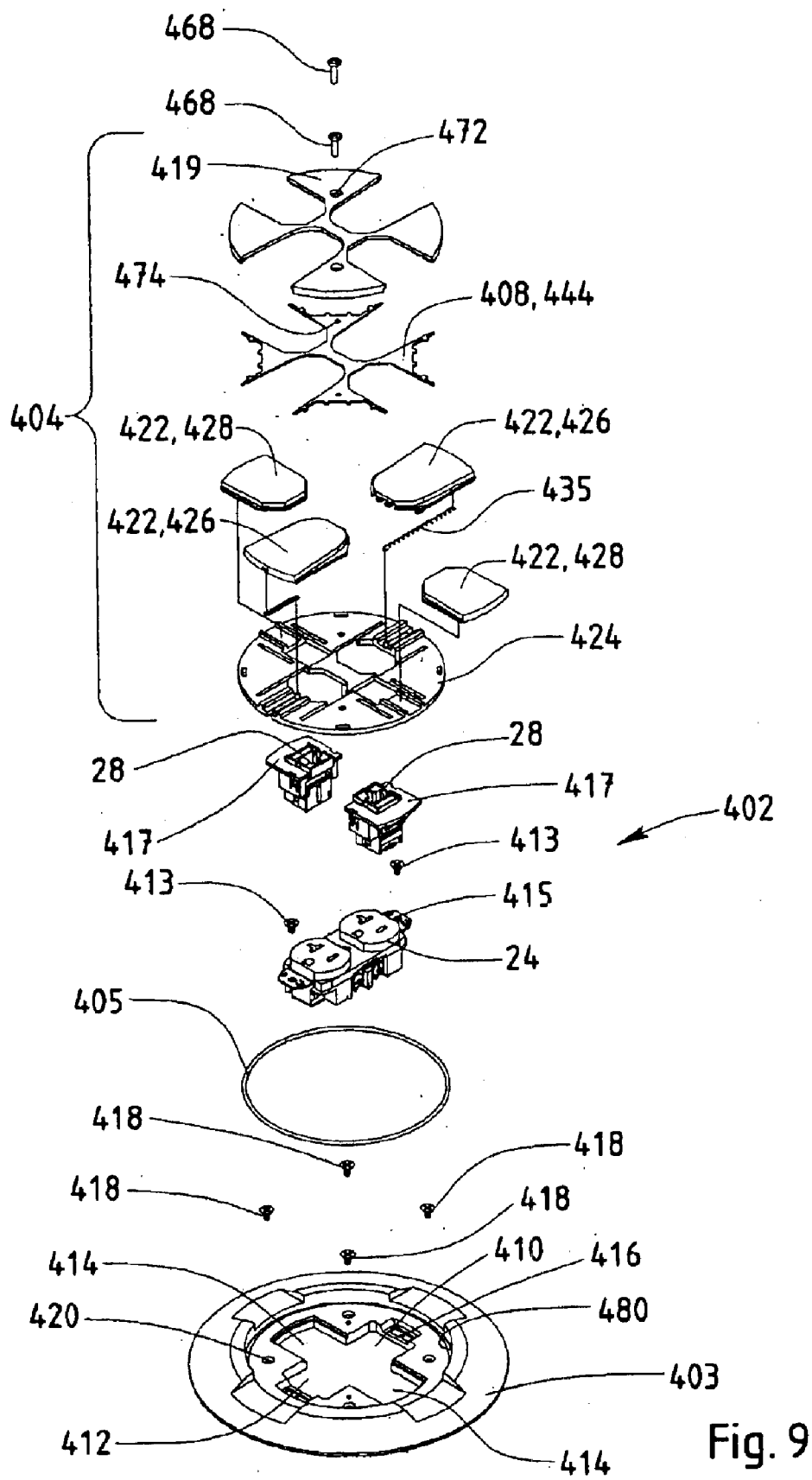
FIG. 9 is an exploded perspective illustrating a cover assembly according to certain aspects of another embodiment of the present invention.
Figure 10:
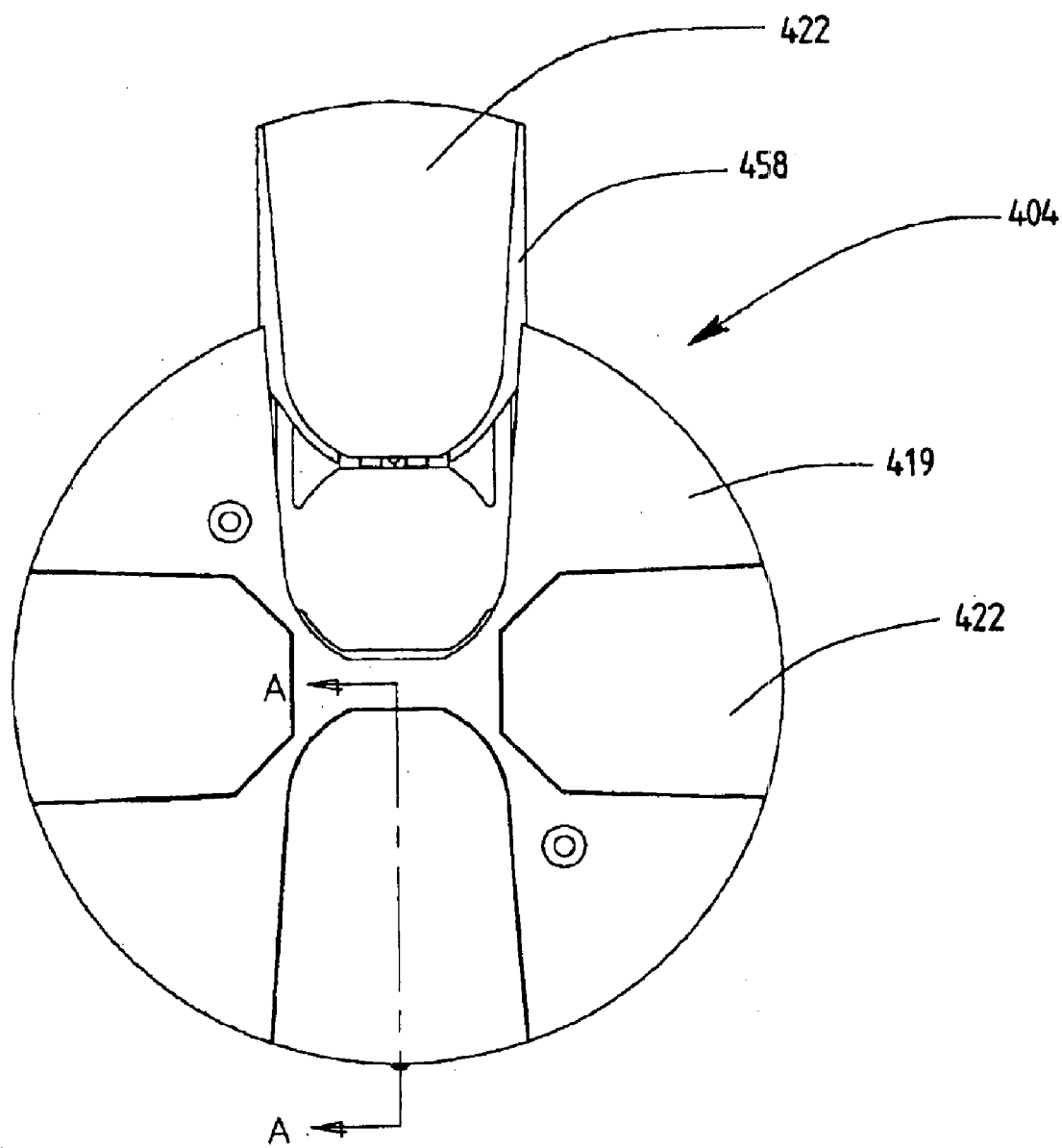
FIG. 10 is a top view of a slide assembly of the cover assembly of FIG. 9.
Figure 11:
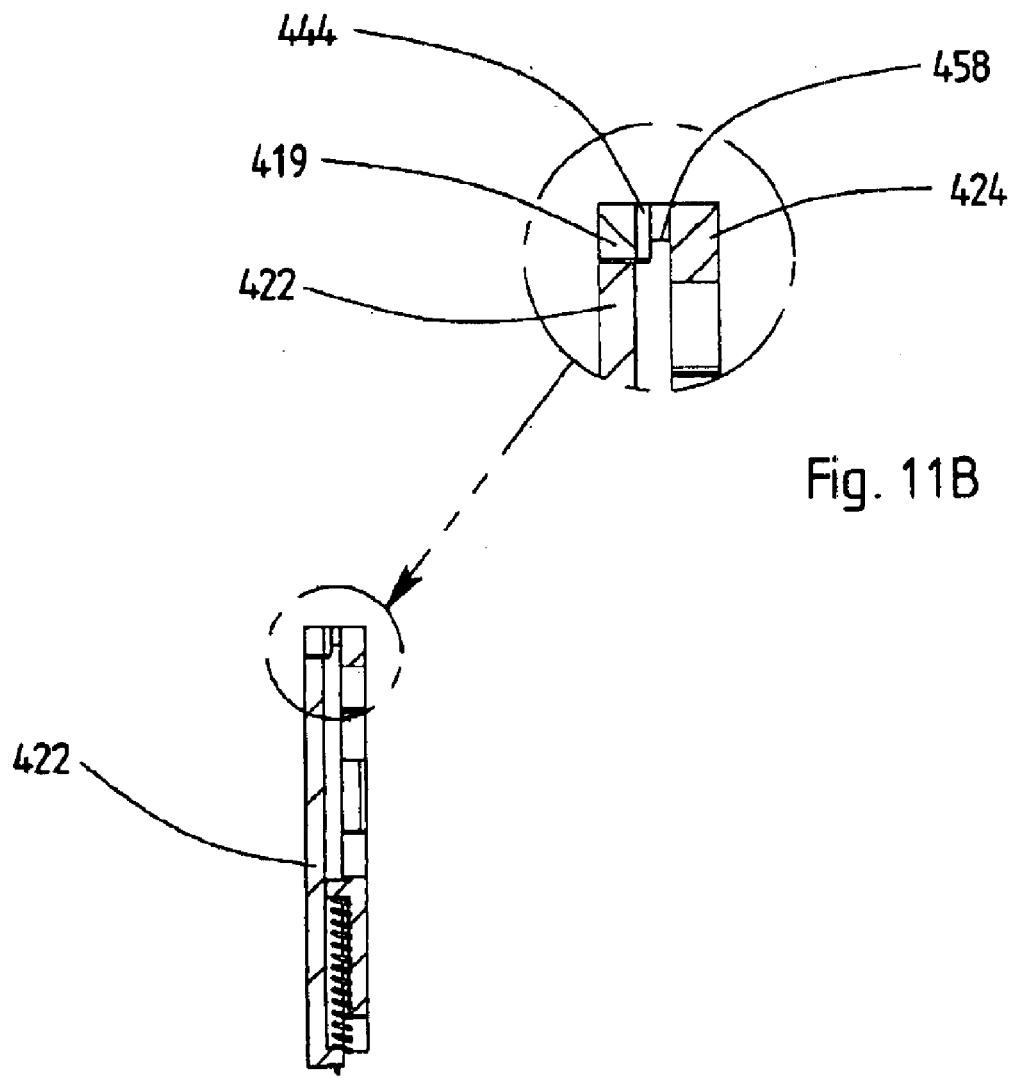
FIG. 11A is a cross-sectional view along line A—A of FIG. 10.
FIG. 11B is an enlarged view of a portion of FIG. 11A.
Figure 14:
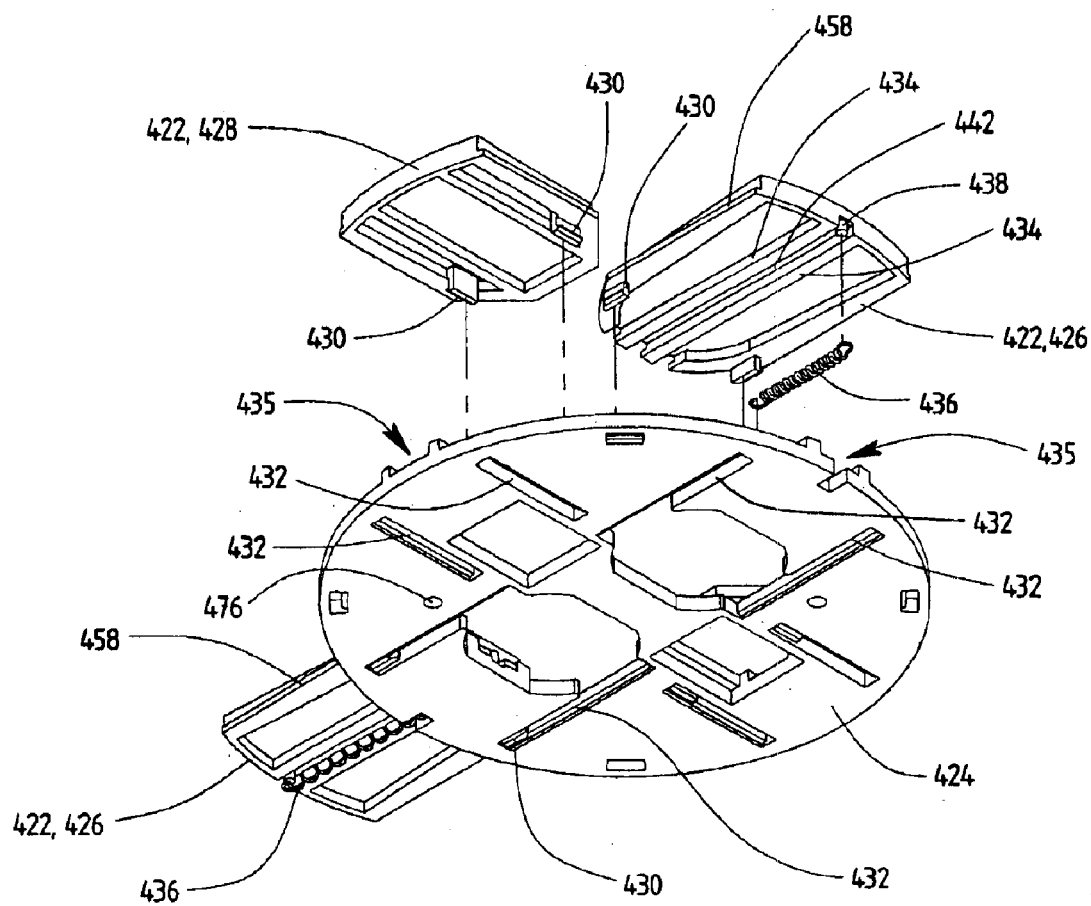
FIG. 14 is a bottom exploded perspective view illustrating the manner in which access doors are connected to a bottom member in the cover assembly of FIG. 9.
Figure 15:
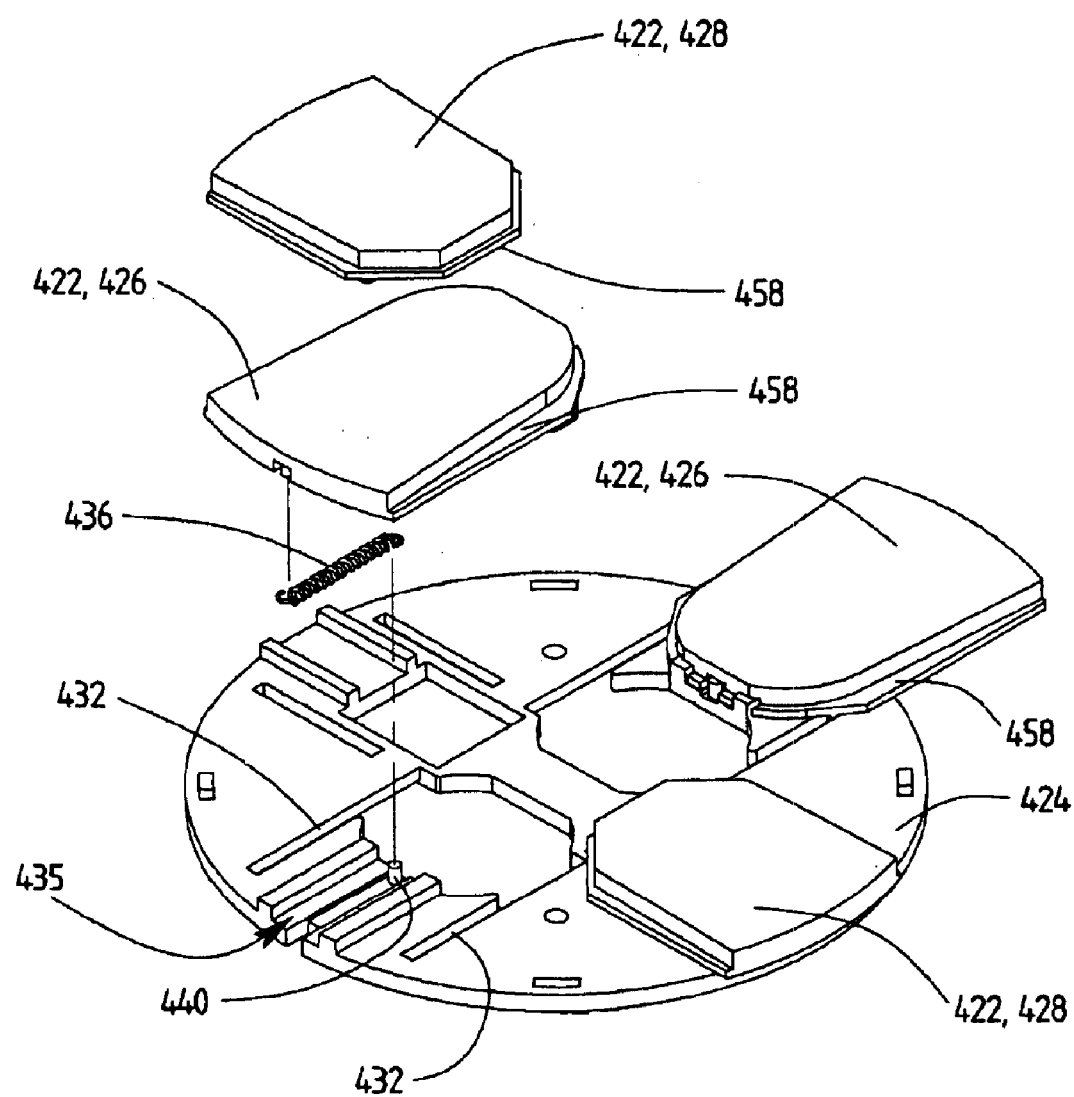
FIG. 15 is an exploded top perspective view of the components shown in FIG. 14.

As can best be seen in FIGS. 9, 14 and 15, fingers 430 formed on bottom faces of the access doors 422 are configured to mate with reciprocal slots or grooves 432 formed in the bottom portion 424 for slidably connecting the access doors to the bottom portion. Each door may further include a longitudinally extending rib or leg 434 (or a plurality of such legs). The legs 434 are configured to engage with reciprocal grooves or tracks 435 formed in the top face of bottom portion 424. Springs 436 are provided for biasing the power access doors 426 to their closed positions. Each spring 436 extends between a post 438 formed on the bottom of an associated power access door 426 and a post 440 formed on the top face of the bottom portion 424. The legs 434 on the bottom of the power access doors 428 are separated by a channel 442, which is configured to house the spring 436. It will be appreciated that, although not shown, the communication/data access doors 428 could also be spring biased.

Figure 13:
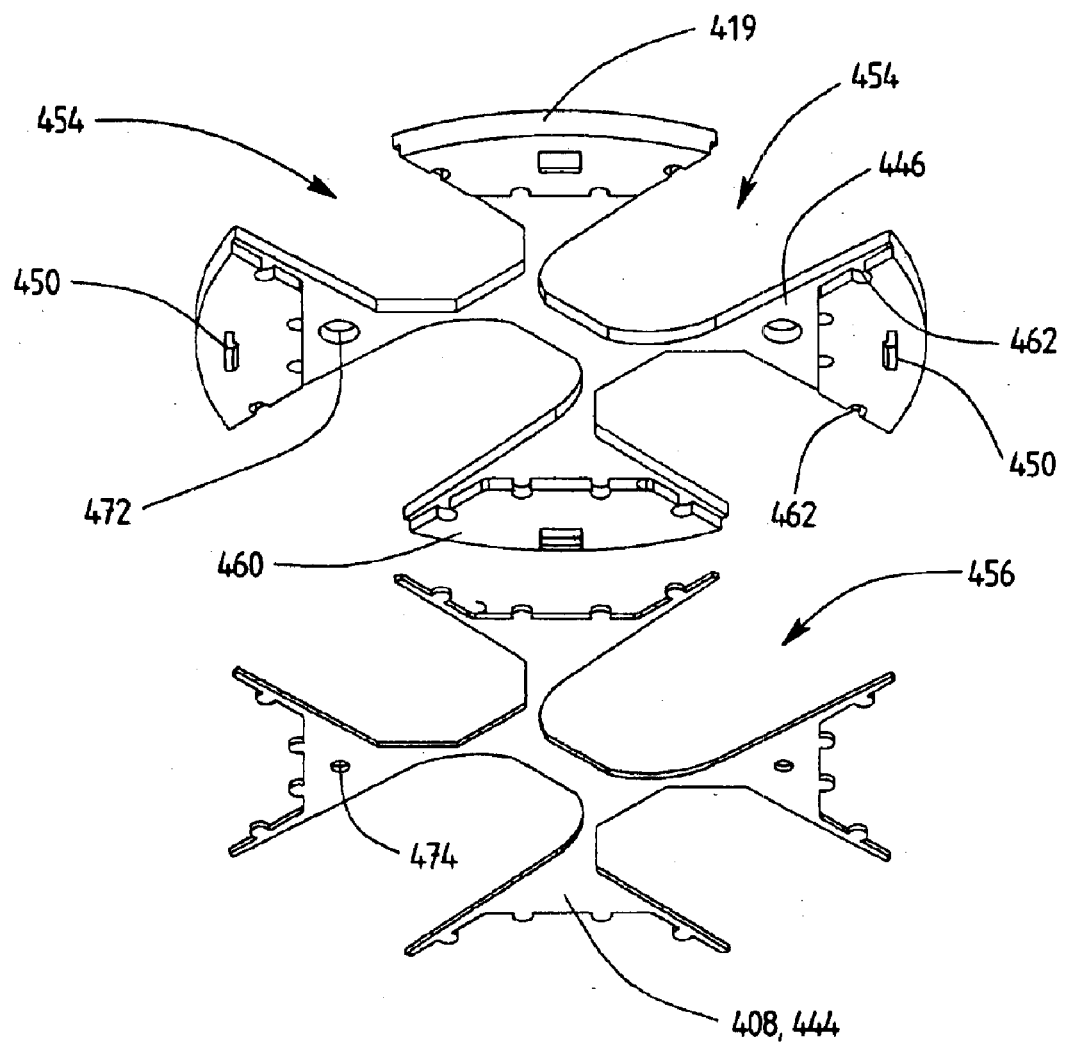
FIG. 13 is a bottom exploded perspective view of a top member and a seal member from a cover plate assembly used in the cover assembly of FIG. 9.
Figure 16:
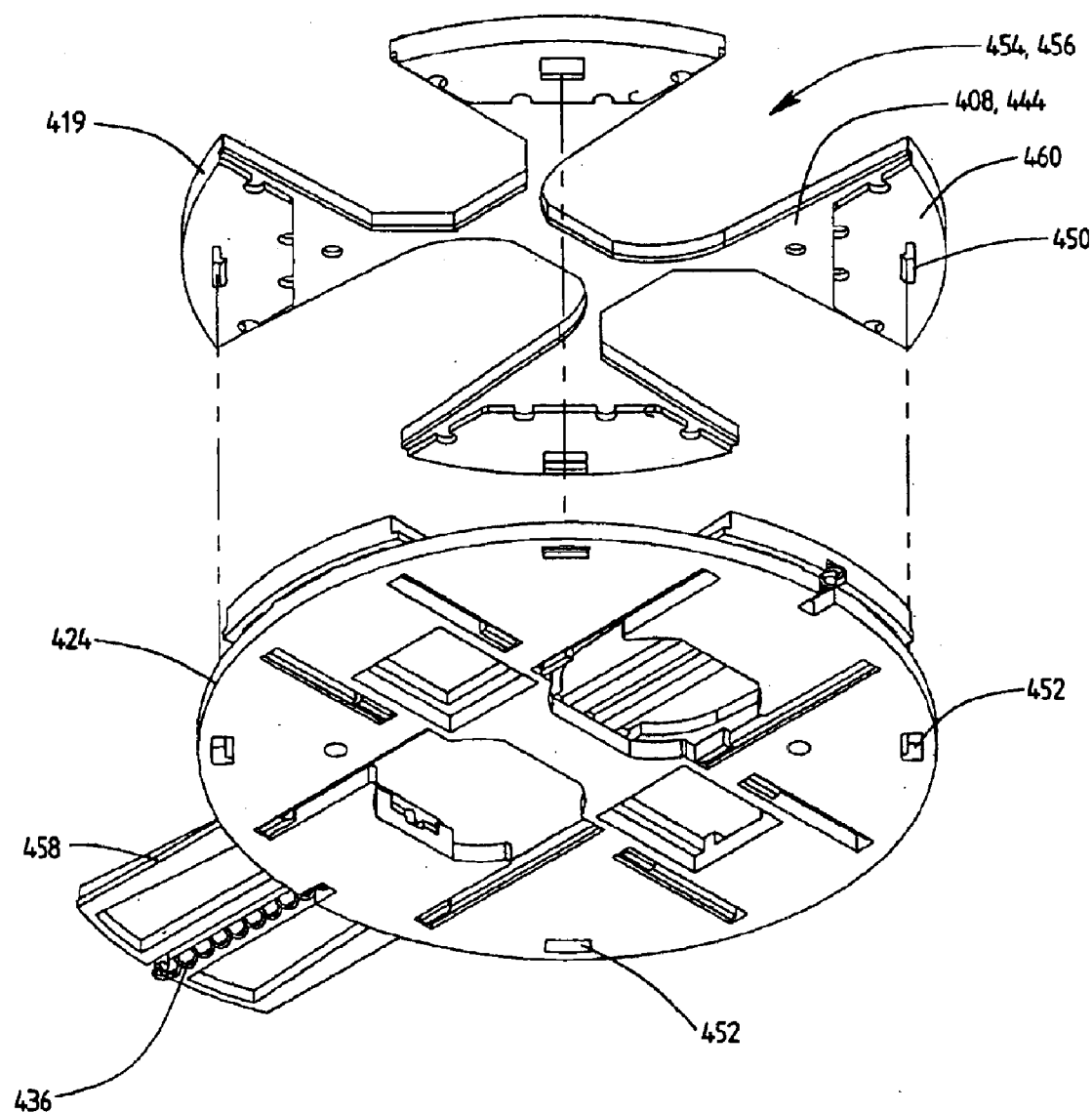
FIG. 16 is a bottom exploded perspective view of a cover plate assembly used in the cover assembly of FIG. 9.

Referring to FIG. 13 and 16, the third seal member 408 is in the form of a gasket 444 that is interposed between the top and bottom portions 419, 424 of the cover plate 404. The gasket 444 is preferably in the form of a flexible polymeric gasket that is co-molded with either the top or bottom portion of the cover plate 404. In the illustrated embodiment, the gasket 444 is co-molded with the top portion 419 of the cover plate.

Snap fingers 450 formed on the bottom face of the top portion 419 are configured to mate with reciprocal openings 452 in the bottom portion 424 for securing the top and bottom portions together. It will be appreciated that other means, such as threaded fasteners, could also be used to secure the top and bottom portions 419, 424 together.

The top portion 419 and co-molded gasket 444 include respective openings 454, 456 for receiving the access doors 422. The access doors 422 include outwardly extending flanges 458 that underlie the edges of the openings 454, 456 when the top portion 419, with its co-molded gasket 444, are secured to the bottom portion 424. When the top portion 419 is connected to the bottom portion, the co-molded gasket 444 compresses against the flanges 458 on the access doors to seal around the access doors.

As can be seen in FIGS. 13 and 16, the third seal member 408 is generally coextensive with the top portion 419, except where the top portion includes pads 460 of increased thickness. When the top portion 419 is secured to the bottom portion 424, the pads 460 engage against the top face of the bottom portion 424. The pads 460 are sized in thickness to ensure proper compression of gasket 408 against the flanges 458 of the access doors 422.

The pads 460 include cut out sections 462. When the gasket 444 is co-molded to the top portion 419, the gasket material flows into the cut out sections 462. The cut out sections 462 increases the area of surface contact between the gasket 444 and the top portion 419, thereby adding the integrity of the co-molded bond between these components.

The cover plate 404 is secured to the trim flange 403 by fasteners 468 (see FIG. 9) that extend through the cover plate and thread into reciprocal apertures in the trim flange. The top portion 419, co-molded gasket 444 and bottom portion 424 include respective apertures 472, 474, 476 for allowing the fasteners 468 to extend through the cover plate 404. The apertures 474 in the gasket 444 are of a reduced diameter, so as to seal against moisture infiltration around the fasteners 468.

Figure 12:
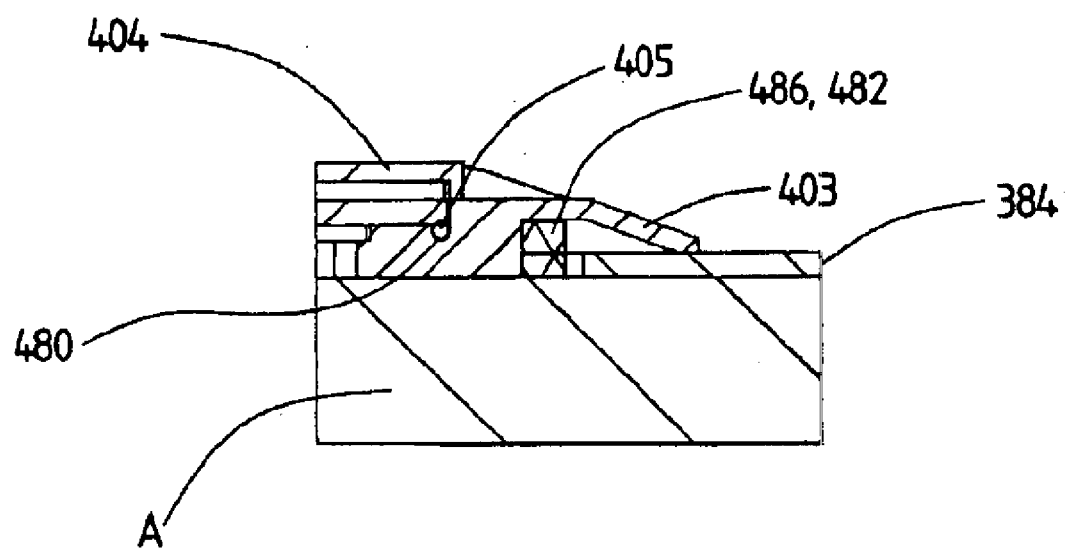
FIG. 12 is a partial cross-sectional view showing the cover assembly of FIG. 9 installed on an in-floor fitting.

As can be seen in FIGS. 9 and 12, the first seal member 405 includes a bead seal or O-ring configured to mate with a reciprocal groove 480 formed in the top face of the trim flange 403 around the perimeter of the central opening 410. The first seal member 405 is compressed between the cover plate 404 and the trim flange 403 to prevent water from entering the clearance opening between the cover plate 404 and the trim flange 403. As will be appreciated, the first seal member 405 could take other forms while still performing this function. For example, the first seal could be in the form of a planar gasket with a downwardly extending annular bead or rib, as is shown above in the first seal member 5. In addition, it will be appreciated that the cover plate 404 could include an annular groove in its bottom face for receiving a portion of the first seal member 405.

The second seal member 406 is of the same general construction as the second seal member 5 described above. In particular, the second seal member 406 includes at least one compressible annular gasket 482 which extends around the perimeter of the floor opening and is compressed between the trim flange 403 and the floor to provide a watertight seal between the trim flange and the floor. (See FIG. 12) As was described above, the second seal member may include a first, inner gasket which is sized such that it is compressed between the flange 3 and the main floor A, and a second, outer gasket which is sized such that it is compressed between the finished floor 384 and the flange 3.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A cover assembly for use with a fitting of the type which is disposed in a floor and has an inner compartment accessible through an opening in the upper surface of the floor, the fitting being configured so that source cables can be routed into the inner compartment from a location below the upper surface of the floor, the cover assembly comprising:

a mounting bracket connectable to the fitting at a location which overlies the floor opening, the mounting bracket being adapted to support at least one receptacle within the fitting such that the receptacle can be interconnected with a source cable within the inner compartment and can be interconnected from above the floor with a connector;

a cover plate connected to the mounting bracket and overlying the electrical receptacle, the cover plate having an access door movable between a first position at which the door overlies the receptacle to prevent access thereto and a second position at which the receptacle is exposed and accessible through the cover plate;

a first seal member interposed between the mounting bracket and the cover plate and being adapted to seal against water infiltration between the mounting bracket and the cover plate and into the fitting; and a second seal member directly abutting the upper surface of the floor, said second seal member interposed between the mounting bracket and the upper surface of the floor and being adapted to seal against water infiltration between the mounting bracket and the floor and into the fitting.

2. A cover assembly as set forth in claim 1, wherein the first seal member overlies the receptacle and at least the portion of the mounting bracket adjacent to and surrounding the perimeter of the receptacle, the first seal member including an access opening which provides access to the receptacle, an upwardly extending rib formed around the perimeter of the access opening and being positioned to abut with the access door when the access door is at its closed position so as to seal against water infiltration between the rib and the door, and a downwardly extending rib configured to mate with a reciprocal groove formed in the mounting bracket around the perimeter of the receptacle so as to seal against water infiltration between the first seal member and the mounting bracket.

3. A cover assembly as set forth in claim 1, wherein the second seal member comprises at least one gasket extending around the perimeter of the floor opening and being adapted to be compressed between the mounting bracket and the upper surface of the floor when the mounting bracket is connected to the fitting.

4. An access cover as set forth in claim 1, wherein the access door is slidably connected to the cover plate for movement between its first and second positions.

5. An access cover as set forth in claim 1, wherein the mounting bracket is adapted to support at least one power receptacle.

6. An access cover as set forth in claim 1, wherein the mounting bracket is adapted to support at least one communication/data receptacle.

7. An access cover as set forth in claim 1, wherein the first seal comprises, a bead seal configured to mate with a reciprocal groove formed in the mounting bracket.

8. An access cover as set forth in claim 1, wherein the cover plate includes a top portion, a bottom portion, a plurality of access doors slidably mounted between the top and bottom portions, and a third seal interposed between the top and bottom portions and being adapted to seal against water infiltration between the top and bottom portions.

9. An access cover as set forth in claim 8, wherein the third seal is co-molded with one of the top and bottom portions.

10. An access cover as set forth in claim 9, wherein the third seal is formed of a compressible polymeric material that is co-molded with one of the top and bottom portions.

11. An access cover as set forth in claim 10, wherein the third seal member is co-molded with the top portion and is configured to seal around the access doors.

12. In a fitting which is adapted to be mounted in a floor and support at least one receptacle such that the receptacle can be connected with cables which enter the fitting from below the surface of the floor and can be connected from above the floor with a connector which enters the fitting through an opening in the surface of the floor, a cover assembly comprising:

a trim flange mounted on the surface of the floor and overlying the floor opening, the trim flange including an opening which provides access to the receptacle;

a cover plate mounted on the trim flange and overlying the receptacle, the cover plate having an access door movable between a first position at which the door overlies the receptacle to prevent access thereto and a second position at which the receptacle is exposed and accessible through the cover plate;

a first seal member interposed between the trim flange and the cover plate and being adapted to seal against moisture infiltration between the trim flange and the cover plate, the first seal member including an opening which overlies the receptacle to provide access thereto and an upwardly extending rib formed around the perimeter of the opening in the first seal member, the upwardly extending rib being positioned to abut with the access door when the access door is at its closed position so as to seal against water infiltration therebetween, the first seal member also including a downwardly extending rib which is configured to mate with a reciprocal groove formed in the trim flange around the perimeter of the receptacle so as to seal against water infiltration between the first seal member and the trim flange; and a second seal member disposed between the trim flange and the floor and which is adapted to seal against water infiltration between the trim flange and the floor and into the fitting.

13. A cover assembly as set forth in claim 12, wherein the second seal member comprises at least one gasket which extends around the perimeter of the floor opening and is compressed between the floor and the trim flange.

14. A cover assembly as set forth in claim 13, wherein the trim flange is securable to the floor fitting and wherein the at least one gasket is configured to be compressed between trim flange and floor when the trim flange is scoured to the floor fitting.

15. An access cover as set forth in claim 12, wherein the trim flange is constructed to function as a mounting bracket for supporting the receptacle within the fitting.

16. An access cover as set forth in claim 12, wherein the access door is slidably connected to the cover plate for movement between its first and second positions.

17. An access cover as set forth in claim 12, wherein the receptacle is a power receptacle.

18. An access cover as set forth in claim 12, wherein the receptacle is a communications/data receptacle.

19. An in-floor fitting of the type which is disposed in a floor and has an inner compartment accessible through an opening in the upper surface of the floor, the fitting being configured so that power cables and communication/data signal cables can be routed into the inner compartment from a location below the upper surface of the floor; the fitting comprising:

a power receptacle mounted in the fitting such that it can be interconnected with a source power cable within the inner compartment of the fitting and can be interconnected from above the floor with an power connector;

a communication/data receptacle mounted in the fitting such that it can be interconnected with a source communication/data signal cable within the inner compartment of the fitting and can be interconnected from above the floor with an communication/data connector;

a cover assembly overlying the floor opening and the receptacles, the cover assembly having a first access door which is movable between a closed position at which it overlies the power receptacle to prevent access thereto and an open position at which the power receptacle is exposed and accessible from above the floor, the cover assembly also having a second access door which is movable between a closed position at which it overlies the communication/data receptacle to prevent access thereto and a second position at which the communication/data receptacle is exposed and accessible from above the floor;

a first seal member interposed cover assembly and the receptacles, the first seal having a first opening which overlies the power receptacle to provide access thereto and a second opening which overlies the communication/data receptacle to provide access thereto, the first seal having a portion which extends upwardly around the perimeter of the first opening and engages against the first access door when the first access door is at its closed position so as to seal against water infiltration into the fitting, the first seal having a second portion which extends upwardly around the perimeter of the second opening and engages against the second access door when the second access door is at its closed position so as to seal against water infiltration into the fitting.

20. A fitting as set forth in claim 19, further comprising:

a second seal member disposed between the cover assembly and the floor, the second seal member extending around the circumference of the floor opening to seal against water infiltration into the fitting.

21. A fitting as set forth in claim 19, wherein the portion of the first seal member which extends upwardly around the first and second openings comprise ribs.

22. A fitting as set forth in claim 19, wherein the cover assembly comprises:

a trim flange overlying the floor opening and including a center opening which provides access to the receptacles;

a cover plate which carries the first and second access doors and is mounted on the trim flange; and wherein the first seal is interposed between the trim flange and the cover plate.

23. A fitting as forth in claim 22, wherein the first seal includes a downwardly extending rib which extends around the receptacles and mates with a reciprocal groove formed in the trim flange.

24. A fitting as set forth in claim 22, wherein the access doors are slidably connected to the cover plate for movement between their open and closed positions.

25. A fitting as set forth in claim 22, wherein the trim flange is adapted to support the power and communication/data receptacles within the fitting.

26. A cover assembly for a flush poke-thru wiring fitting of the type which is adapted to be supported in a floor opening in a floor of a building structure, the cover assembly comprising:

a first portion connectable to the fitting, the first portion having a generally planar body which overlies the floor opening and a flange which extends around the perimeter of the planar body and overlies the surface of the floor, the body of the first portion including an opening which provides access to at least one power receptacle and at least one communication/data receptacle;

a second portion mountable on the first portion and overlying the opening in the first portion, the second portion having a plurality of access doors slidably connected thereto, each of the access doors being associated with a different one of the power and signal receptacles, and being movable between a first position at which it overlies the associated receptacle and a second position at which the associated receptacle is exposed and accessible from above the floor;

a first seal interposed between the first and second portions and being adapted to seal against water infiltration therebetween, the first seal including a plurality of openings which provide access to the receptacles, the first seal further including a plurality of upwardly extending ribs which extend around the perimeters of the openings, the ribs being positioned to engage against the access doors when the doors are in their closed positions to seal against water infiltration therebetween, the first seal further including a downwardly extending rib which is configured to mate with a reciprocal groove formed in the first portion around the perimeter of its central opening so as to seal against water infiltration therebetween; and a second seal disposed between the flange of the first portion and the floor, the second seal extending around the circumference of the floor opening to seal against water infiltration into the floor fitting.

27. A cover assembly as set forth in claim 26, wherein the central opening in the first portion is adapted to support at least one power receptacle and at least one communication/data receptacle within the chamber such that the receptacles can be connected with source cables within the chamber and can be selectively connected to above floor power and communication/data connectors, respectively.

28. In a fitting a cover assembly comprising:

a bottom portion connected to the fitting at a location which overlies the floor opening;

a top portion connected to the bottom portion;

at least one access door slidably mounted between the top and bottom portions for movement between a first position at which it overlies the at least one receptacle and a second position at which the at least one receptacle is exposed and accessible through the floor opening; and a seal member co-molded with one of the top and bottom portions and being adapted to seal against water infiltration between the top and bottom portions.

29. A cover assembly as set forth in claim 28, wherein the seal member is formed of a compressible polymeric material that is co-molded with one of the top and bottom portions.

30. An access cover as set forth in claim 28, wherein seal member adapted to seal around the access doors.

31. In a fitting which is adapted to be mounted in a floor and support at least one power receptacle such that the receptacle can be connected with source power cables which enter the fitting from below the surface of the floor and can be connected from above the floor with a power connector which enters the fitting through an opening in the surface of the floor, a cover assembly comprising:

a trim flange mounted on the surface of the floor and overlying floor opening, the trim flange including an opening which provides access to the electrical receptacle;

a cover plate mounted on the trim flange and overlying the electrical receptacle, the cover plate including a top portion, a bottom portion connected top portion, an access door slidably mounted between the top and bottom portions for movement between a first position at which it overlies the receptacle and a second position at which the receptacle is exposed and accessible through the floor opening, and a cover plate seal member disposed between the top and bottom portions and being adapted to seal against water infiltration between the top and bottom portions;

an inner seal member interposed between the trim flange and the cover plate and being adapted to seal against moisture infiltration between the trim flange and the cover plate;

an outer seal member disposed between the trim flange and the floor and which is adapted to seal against water infiltration between the trim flange and the floor.

32. An access cover as set forth in claim 31, wherein the cover plate seal member is co-molded with one of the top and bottom portions.

33. An access cover as set forth in claim 31, wherein the cover plate seal member is co-molded with the top portion and is configured to seal around the access doors.

* * * * *